(12) United States Patent
Tanaka et al.

(10) Patent No.: US 9,512,898 B2
(45) Date of Patent: Dec. 6, 2016

(54) WORM GEAR MECHANISM

(71) Applicant: HONDA MOTOR CO., LTD., Minato-Ku, Tokyo (JP)

(72) Inventors: Yosuke Tanaka, Wako (JP); Yasuo Shimizu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 14/362,749

(22) PCT Filed: Dec. 3, 2012

(86) PCT No.: PCT/JP2012/081254
§ 371 (c)(1),
(2) Date: Jun. 4, 2014

(87) PCT Pub. No.: WO2013/084838
PCT Pub. Date: Jun. 13, 2013

(65) Prior Publication Data
US 2014/0331802 A1    Nov. 13, 2014

(30) Foreign Application Priority Data
Dec. 6, 2011   (JP) .................. 2011-267389

(51) Int. Cl.
*F16H 1/16*     (2006.01)
*F16H 55/22*    (2006.01)
(Continued)

(52) U.S. Cl.
CPC ............... *F16H 1/16* (2013.01); *F16H 55/06* (2013.01); *F16H 55/08* (2013.01); *F16H 55/22* (2013.01); *Y10T 74/19828* (2015.01)

(58) Field of Classification Search
CPC ............ B23F 5/22; B23F 9/08; B23F 9/082; B23F 9/084; B23F 11/00; B23F 13/00; B23F 13/02; B23F 17/00; B23F 19/104; B23F 21/16; F16H 1/16; F16H 1/166; F16H 2025/209; F16H 2057/128; F16H 29/20; F16H 2061/2892; F16H 2063/3066; F16H 55/02; F16H 55/06; F16H 55/17; F16H 55/22; F16H 55/08; F16H 55/0806; F16H 55/088; F16H 2055/065; Y10T 407/1715; Y10T 407/173; Y10T 407/1962; Y10T 74/18792; Y10T 74/19047; Y10T 74/19828; Y10T 74/19953; Y10T 409/10; Y10T 409/101431; Y10T 409/10159; Y10T 409/101749; Y10T 409/102067

USPC ......... 74/89.14, 458, 724, 425, 500; 29/893, 29/893.1, 893.2, 893.3, 893.31, 893.35, 29/893.36, 893.37

See application file for complete search history.

(56) References Cited

U.S. PATENT DOCUMENTS 3,595,130  A  *  7/1971  Maker ................... B23F 5/20
                                               409/10
4,651,588  A  *  3/1987  Rouverol ............ F16H 55/0806
                                               74/462

(Continued)

FOREIGN PATENT DOCUMENTS

JP    2004-330937 A    11/2004
JP    2005-003099 A    1/2005

(Continued)

*Primary Examiner* — William Kelleher
*Assistant Examiner* — Leonard J Archuleta
(74) *Attorney, Agent, or Firm* — Carrier Blackman & Associates, P.C.; Joseph P. Carrier; William D. Blackman

(57) ABSTRACT

A worm gear mechanism (44) comprises a worm (70) and a worm wheel (80) meshed with the worm. In the teeth of a hob (90) used for the gear cutting of the worm wheel, at least the addendum surfaces (91c) are formed into arcuate shapes. The radial centers (93) of the arcs of the addendum surfaces are positioned nearer to a center line (WL') of the hob than a pitch line (94) of the hob. The worm wheel is cut into a gear by the hob. The worm is formed into the same shape as the hob. The recess meshing length (L) of the worm gear mechanism is designed to be greater than the recess meshing length (Llim) of a conventional worm gear mechanism.

4 Claims, 25 Drawing Sheets

(51) Int. Cl.
  *F16H 55/08* (2006.01)
  *F16H 55/06* (2006.01)

(56) References Cited

U.S. PATENT DOCUMENTS

| | | | | |
|---|---|---|---|---|
| 5,271,289 A * | 12/1993 | Baxter, Jr. | ............. | F16H 55/08 29/893 |
| 5,829,305 A * | 11/1998 | Ham | ......... | F16H 1/16 49/341 |
| 5,953,957 A * | 9/1999 | Ham | ......... | F16H 1/16 74/425 |
| 6,077,150 A * | 6/2000 | Jankowski | ............. | B24B 53/12 451/147 |
| 6,151,941 A * | 11/2000 | Woolf | ............ | B21H 5/022 72/102 |
| 6,497,041 B2 * | 12/2002 | Fujita | ................ | B29C 45/0055 264/138 |
| 6,779,270 B2 * | 8/2004 | Sonti | ...................... | B21H 5/022 29/893.3 |
| 6,976,556 B2 * | 12/2005 | Shimizu | ............. | B62D 5/0409 180/444 |
| 7,600,602 B2 * | 10/2009 | Kuroumaru | ......... | B62D 5/0412 180/443 |
| 7,604,088 B2 * | 10/2009 | Nishizaki | ................ | B62D 6/10 180/444 |
| 7,641,850 B2 * | 1/2010 | Sontti | ................... | B21H 5/022 148/573 |
| 7,654,167 B2 * | 2/2010 | Watanabe | ............ | B62D 5/0409 74/388 PS |
| 7,798,033 B2 * | 9/2010 | Oberle | ................ | B62D 5/0409 74/388 PS |
| 7,979,988 B2 * | 7/2011 | Shiino | ..................... | B23F 11/00 29/893.31 |
| 8,683,887 B2 * | 4/2014 | Yamazaki | ................ | B62D 3/12 74/388 PS |
| 2009/0000120 A1 * | 1/2009 | Shiino | ..................... | B23F 11/00 29/893.31 |
| 2009/0120711 A1 * | 5/2009 | Shiino | ................. | B62D 5/0406 180/443 |
| 2010/0307274 A1 * | 12/2010 | Akiyama | ........... | B22D 17/2245 74/458 |
| 2014/0090503 A1 * | 4/2014 | Ohmi | .................... | B23F 17/005 74/434 |
| 2015/0211622 A1 * | 7/2015 | Ohmi | ................. | F16H 55/0806 74/457 |

FOREIGN PATENT DOCUMENTS

| | | |
|---|---|---|
| JP | 2007-177812 A | 7/2007 |
| JP | 2007-269065 A | 10/2007 |
| JP | 2009-248690 A | 10/2009 |
| JP | 2010-270908 A | 12/2010 |

* cited by examiner

FIG.5
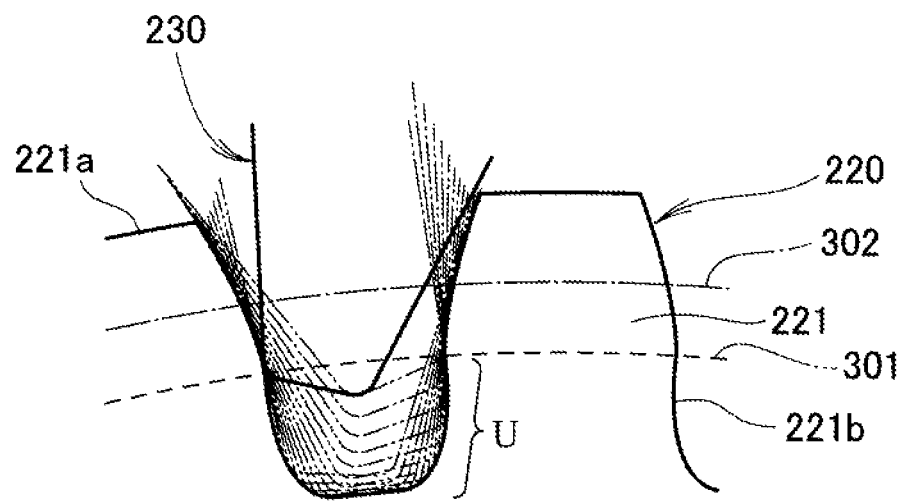
(a) CONVENTIONAL EXAMPLE
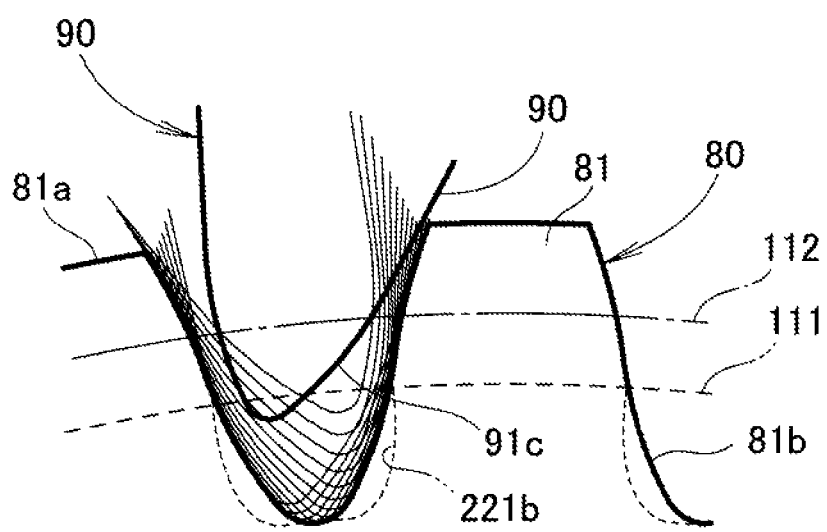
(b) EMBODIMENT

FIG.18
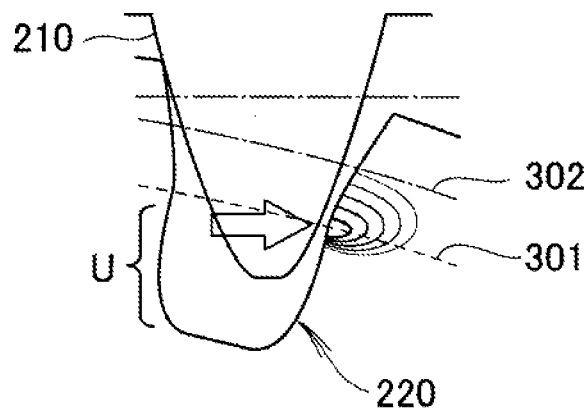
(a) COMPARATIVE EXAMPLE
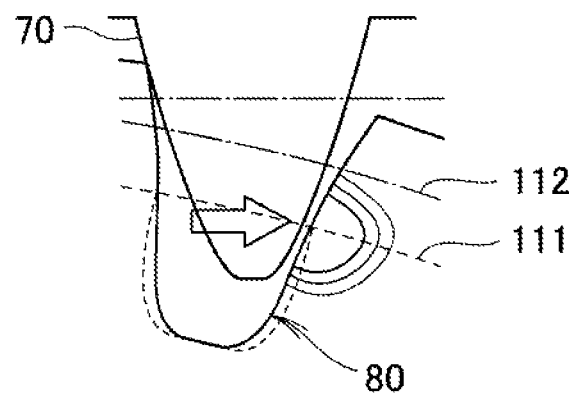
(b) EMBODIMENT

FIG.19
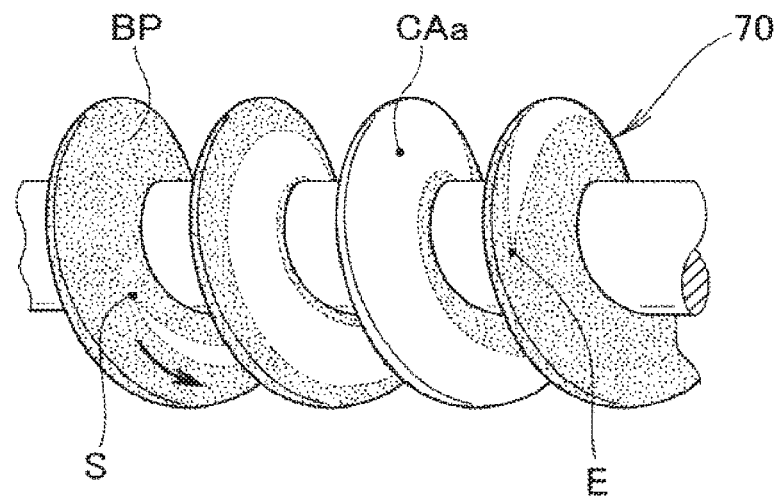
(a)
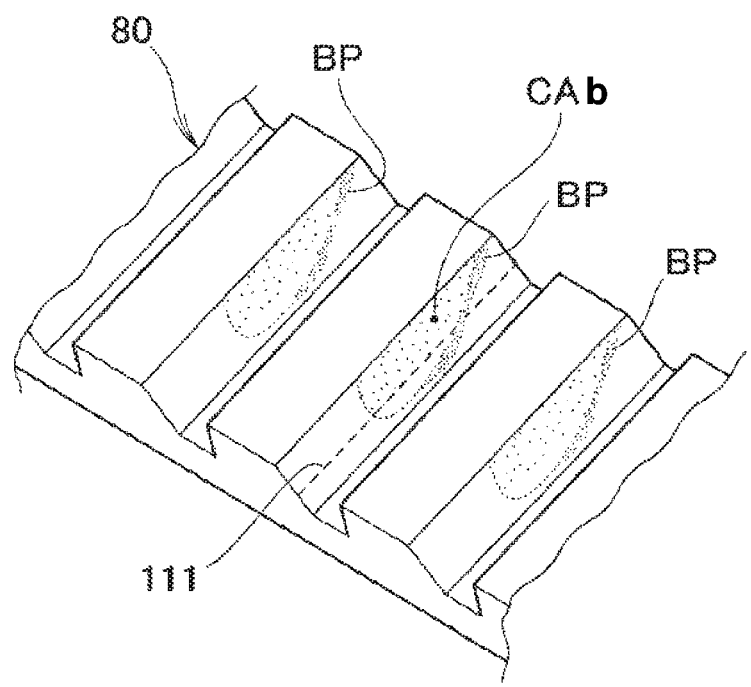
(b)

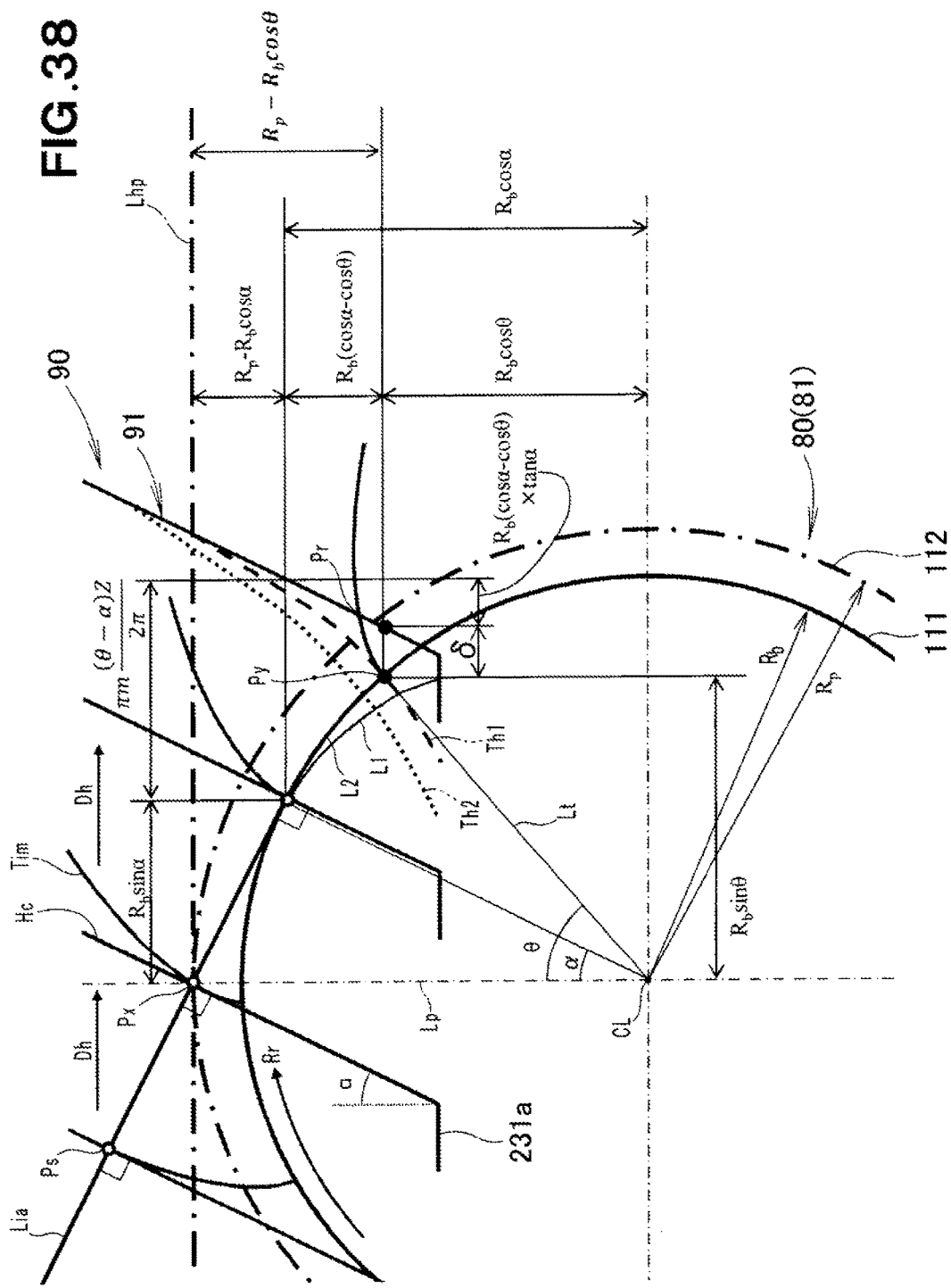

WORM GEAR MECHANISM

TECHNICAL FIELD

The present invention relates to a technique for improving a worm gear mechanism.

BACKGROUND ART

A worm gear mechanism is installed, for example, in a power steering device of a vehicle (see, for example, FIG. 14 in Patent Literature 1).

The worm gear mechanism as disclosed in Patent Literature 1 is provided with a worm coupled to an electric motor through a worm shaft, and a worm wheel configured to mesh with the worm. It is a transmission mechanism configured to boost and transmit auxiliary torque generated by the electric motor from the worm to the worm wheel.

In general, when the worm is rotated and force is applied in a direction of pushing the worm wheel, the worm receives reaction force from the worm wheel at a contact point of the worm and the worm wheel. It is preferred that strength of the worm gear mechanism be enhanced as it may contribute to extending a life of the worm gear mechanism.

PRIOR ART LITERATURE

Patent Literature

Patent Literature 1: JP 2010-270908 A

SUMMARY OF INVENTION

Technical Problem

It is therefore an object of the present invention to provide a technique for enhancing strength of a worm gear mechanism.

Solution to Problem

According to the present invention, in a worm gear mechanism including a worm and a worm wheel meshed with the worm, at least an addendum surface of a tooth of the worm is formed into an arc shape, and a center of a radius of an arc of the addendum surface is positioned nearer to a center line of the worm than a pitch line of the worm, the worm wheel is gear cut by a hob used in gear cutting of the worm wheel, at least an addendum surface of a tooth of the hob being formed into an arc shape, and a center of a radius of an arc of the addendum surface being positioned nearer to a center line of the hob than a pitch line of the hob, and a length of recess path of the worm gear mechanism, in which the worm is meshed with the worm wheel, is set to be larger than a length of recess path of the worm gear mechanism having an involute profile worm and an involute profile worm wheel.

Preferably, at least a tooth of the worm wheel includes a resin molded article.

Advantageous Effects of Invention

With the present invention, it is possible to decrease face pressure around a base circle. Furthermore, since undercutting of a tooth profile on a tooth bottom side of the base circle can be eliminated, it is possible to make the tooth bottom side of the base circle a meshing face. Accordingly, it is possible to increase a contact ratio without increasing a diameter of a tooth tip of the worm wheel, whereby strength of a worm gear mechanism can be enhanced.

Furthermore, since a resin worm wheel has a small elastic modulus, a tooth may be easily bent in the present invention. In a case where a plurality of teeth thereof simultaneously meshes with teeth of the worm, a shared load on the meshed teeth becomes larger as a meshing depth becomes lower. However, it is possible to secure a large contact area in a part where the meshing depth is low, whereby the face pressure can be reduced.

BRIEF DESCRIPTION OF DRAWINGS

FIGS. 5(a) and 5(b) are views comparing a worm wheel illustrated in FIG. 4 with a conventional worm wheel.

FIGS. 18(a) and (b) are views comparing the meshing illustrated in FIG. 17 in detail.

FIGS. 19(a) and (b) are views illustrating a test for verifying performance of the meshing of the worm wheel illustrated in FIG. 14.

FIG. 38 is a view illustrating an amount of rectification necessary for a hob to form the worm wheel illustrated in FIG. 35.

DESCRIPTION OF EMBODIMENTS

An embodiment for carrying out the present invention is described below with reference to the attached drawings.

Embodiment

An example in which a worm gear mechanism according to an embodiment is installed in an electric power steering device and the electric power steering device is used in a vehicle is described.

Figure 1:
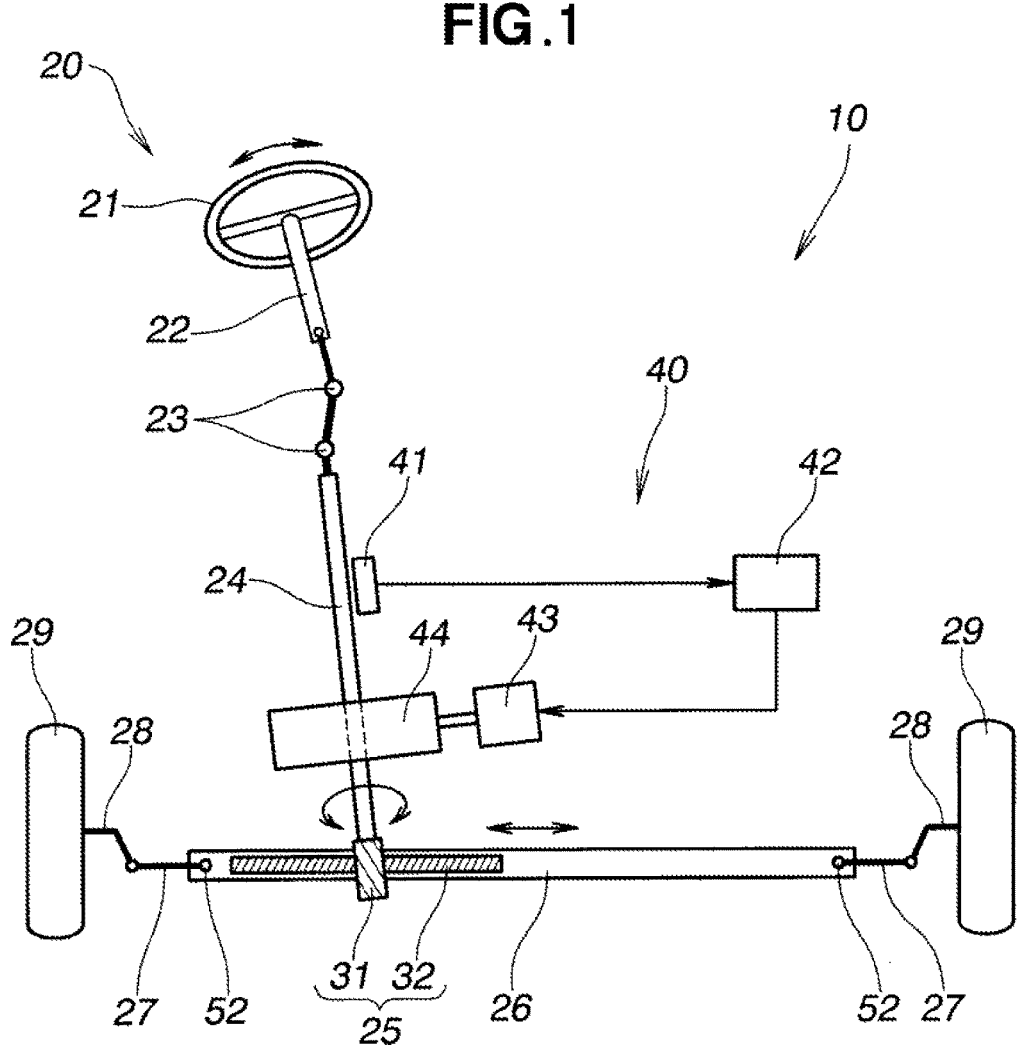
FIG. 1 is a schematic view of an electric power steering device installed with a worm gear mechanism according to the present invention.

As illustrated in FIG. 1, an electric power steering device 10 includes: a steering system 20 ranging from a steering wheel 21 of a vehicle to steered wheels 29 and 29 (for example, front wheels) of the vehicle; and an auxiliary torque mechanism 40 configured to apply auxiliary torque to the steering system 20.

In the steering system 20, the steering wheel 21 is coupled to a pinion shaft 24 through a steering shaft 22 and universal shaft couplings 23 and 23, a rack shaft 26 is coupled to the pinion shaft 24 through a rack and pinion mechanism 25, and the right and left steered wheels 29 and 29 are coupled to both ends of the rack shaft 26 through right and left tie rods 27 and 27 and knuckles 28 and 28.

The rack and pinion mechanism 25 includes a pinion 31 formed in the pinion shaft 24 and a rack 32 formed in the rack shaft 26.

With the steering system 20, it is possible to steer the right and left steered wheels 29 and 29 through the rack and pinion mechanism 25 and the right and left tie rods 27 and 27 by a driver steering the steering wheel 21.

The auxiliary torque mechanism 40 is a mechanism in which a steering torque sensor 41 detects steering torque of the steering system 20 applied to the steering wheel 21. A controller 42 generates a control signal based on a torque detection signal of the steering torque sensor 41. An electric motor 43 generates the auxiliary torque in accordance with the steering torque based on the control signal. The auxiliary torque is transmitted to the pinion shaft 24 through a worm gear mechanism 44. Furthermore, the auxiliary torque is transmitted from the pinion shaft 24 to the rack and pinion mechanism 25 in the steering system 20.

The steering torque sensor 41 detects the torque applied to the pinion shaft 24 and outputs it as the torque detection signal. It may be constituted, for example, by a magnetostriction torque sensor or a torsion bar suspension type torque sensor.

According to the electric power steering device 10, it is possible to steer the steered wheels 29 and 29 through the rack shaft 26 by composite torque in which the auxiliary torque of the electric motor 43 is added to the steering torque by the driver.

Figure 2:
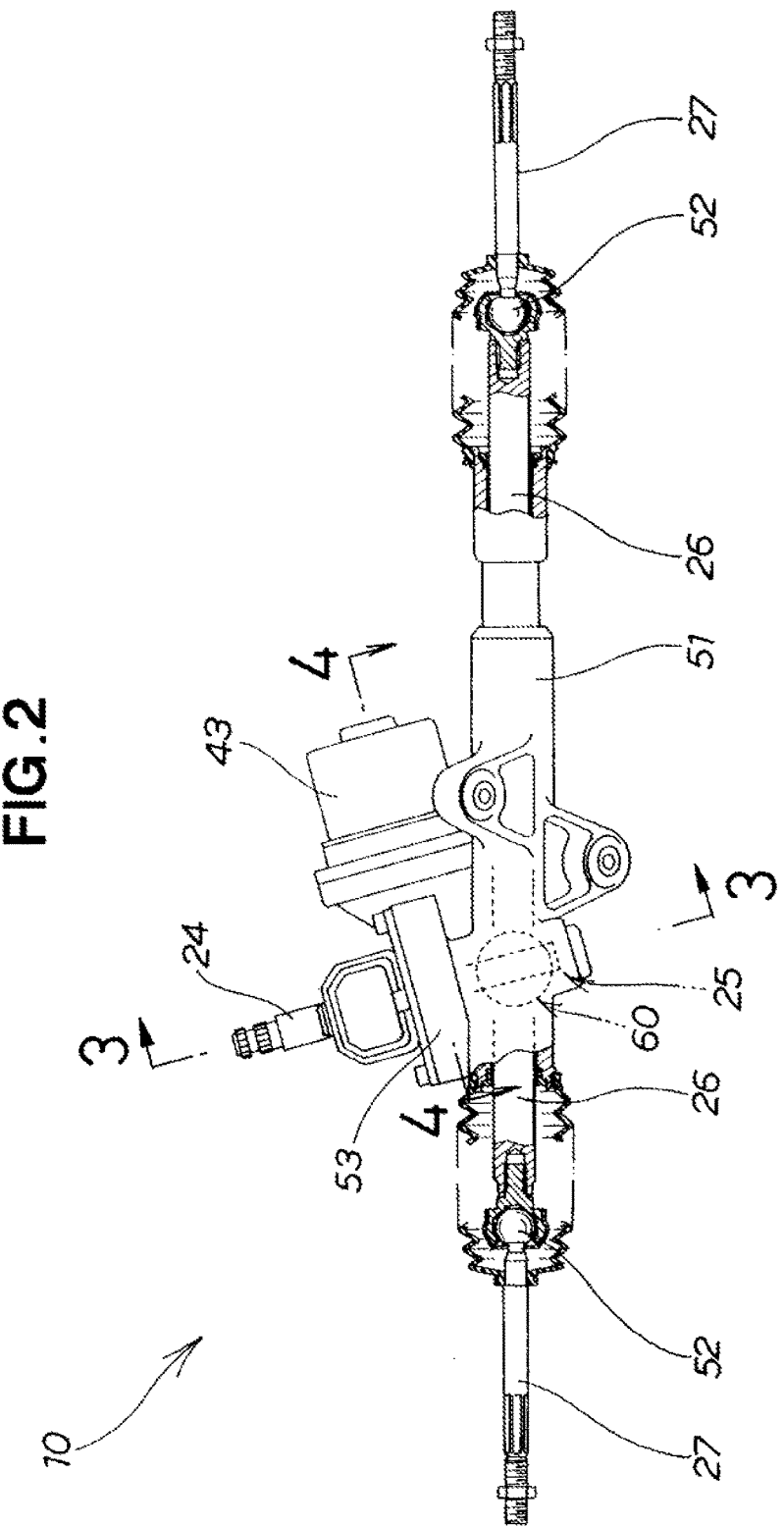
FIG. 2 is a view of whole constitution of the electric power steering device in FIG. 1.

As illustrated in FIG. 2, a housing 51 extends in a vehicle width direction (right and left direction in the figure), and slidably houses the rack shaft 26 in a shaft direction. In the rack shaft 26, the tie rods 27 and 27 are coupled at both ends thereof projecting from the housing 51 in a longitudinal direction through ball joints 52 and 52.

Figure 3:
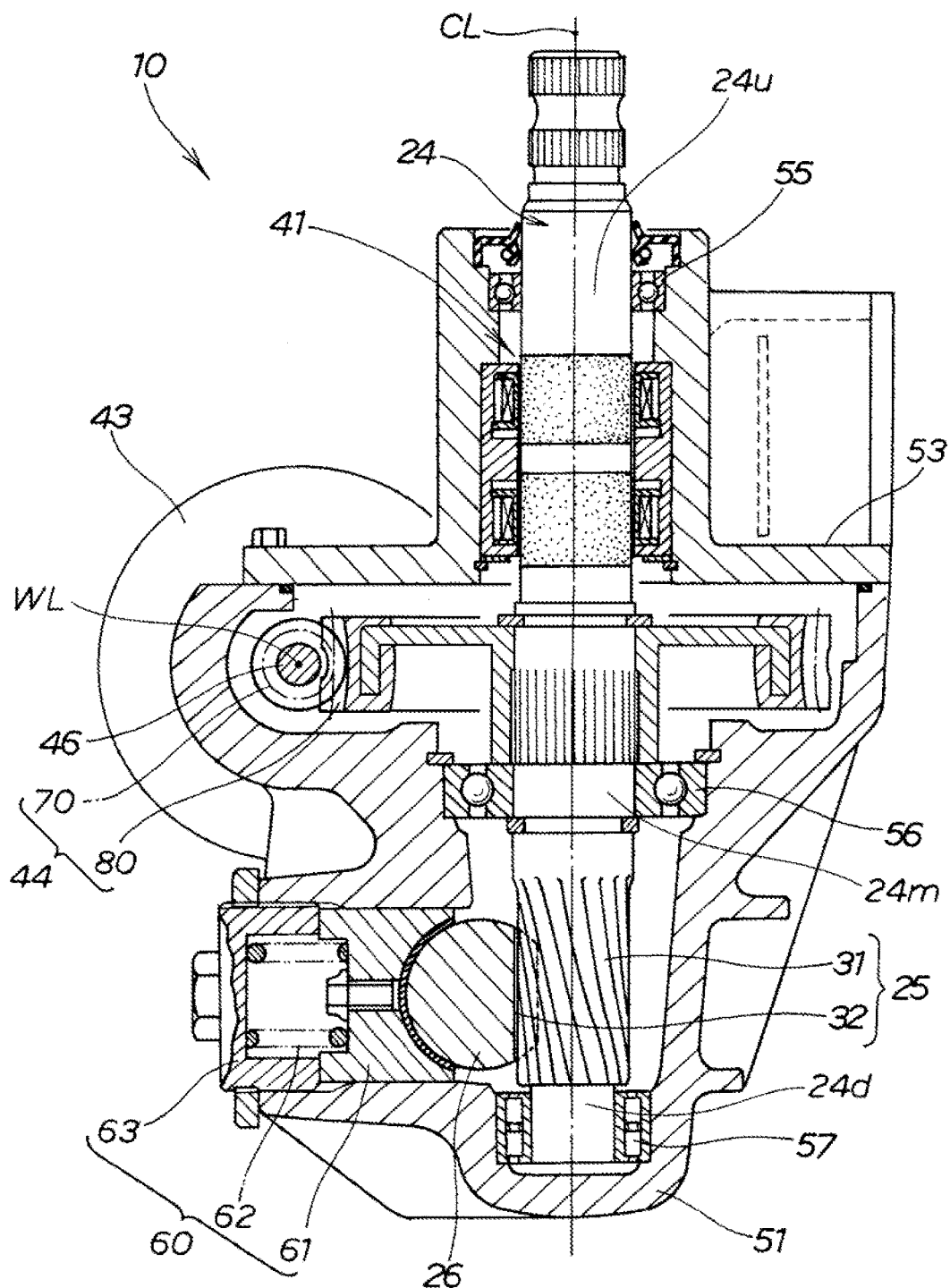
FIG. 3 is a sectional view taken along line 3-3 of FIG. 2.

As illustrated in FIG. 3, the electric power steering device 10 houses the pinion shaft 24, the rack and pinion mechanism 25, the steering torque sensor 41, and a worm gear mechanism 44 inside the housing 51, and an upper portion opening of the housing 51 is covered with an upper portion cover portion 53. The steering torque sensor 41 is attached to the upper portion cover portion 53.

The housing 51 rotatably supports an upper portion 24a, a longitudinal central portion 24m, and a lower end portion 24d of the vertically extending pinion shaft 24 with three bearings (a first bearing 55, a second bearing 56, and a third bearing 57 from the top to the bottom in order). The electric motor 43 is further attached to it, and it is provided with a rack guide 60. Rolling bearings are used as three bearings 55 to 57.

The rack guide 60 is a rack pressurization unit including a guide portion 61, which touches the rack shaft 26 from an opposite side of the rack 32, and an adjustment bolt 63, which pushes the guide portion 61 through a compression spring 62.

Figure 4:
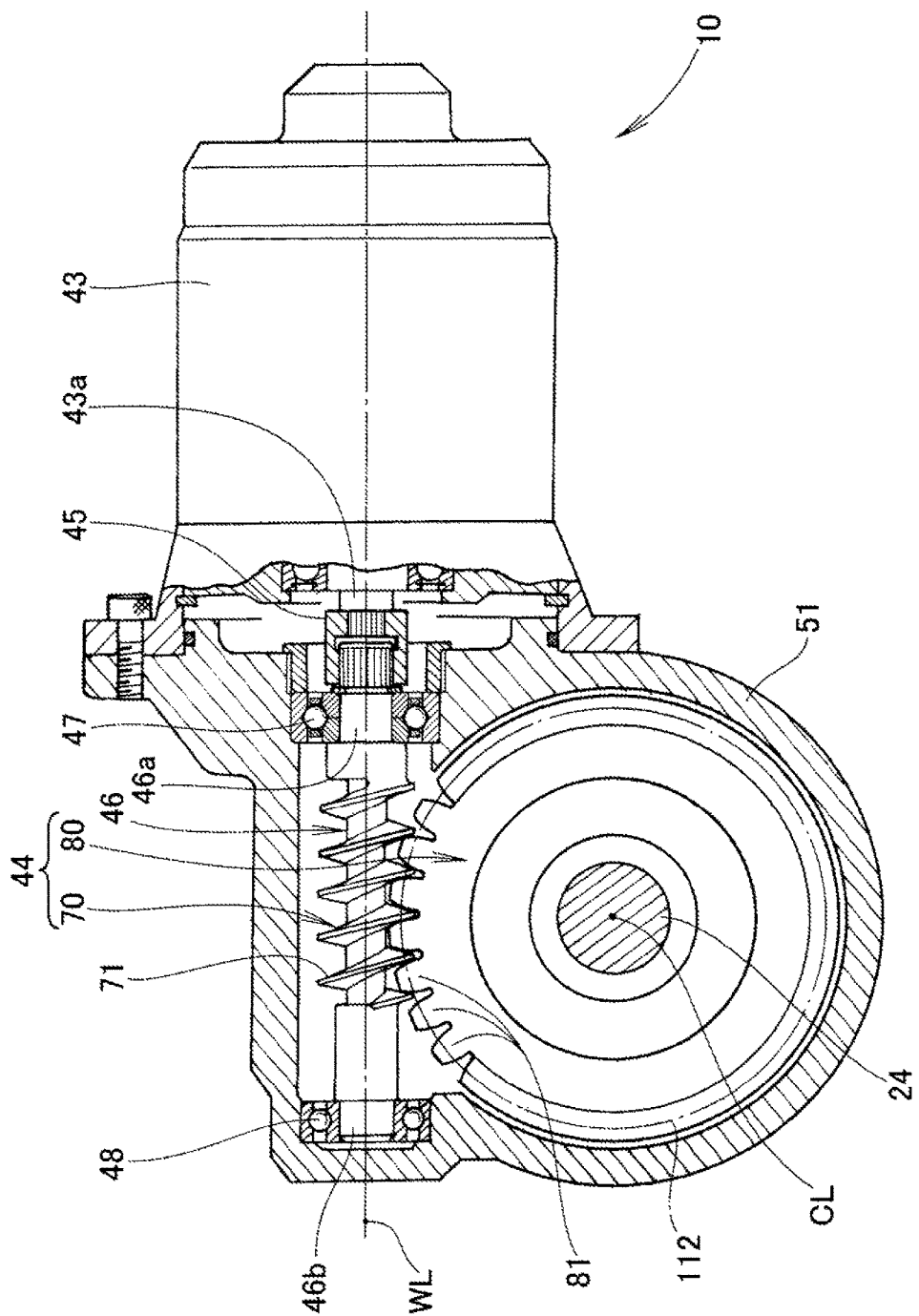
FIG. 4 is a sectional view taken along line 4-4 of FIG. 2.

As illustrated in FIG. 4, the electric motor 43 is attached to a side face of the housing 51, and is provided with a horizontal motor shaft (output shaft) 43a. The motor shaft 43a is extended inside the housing 51 and is coupled with a worm shaft 46 by a shaft coupling 45. The housing 51 rotatably supports both end parts 46a and 46b of the horizontally extending worm shaft 46 through bearings 47 and 48 while limiting movement in a shaft direction. Both of two bearings 47 and 48 are rolling bearings.

The worm gear mechanism 44 is an auxiliary torque transmission mechanism, or a booster mechanism, transmitting the auxiliary torque generated by the electric motor 43 to the pinion shaft 24. To be more specific, the worm gear mechanism 44 includes a worm 70 and a worm wheel 80, which meshes with the worm 70. Hereinafter, the worm wheel 80 is abbreviated as the "wheel 80". Relative to a center line WL of the worm 70, a center line CL of the wheel 80 is arranged at substantially a right angle. The center line CL of the wheel 80 is also the center line CL of the pinion shaft 24.

The worm 70 is a metal product integrally formed with the worm shaft 46, and it is, for example, a steel product such as a carbon steel material for mechanical structure (JTS-G-4051). The whole wheel 80 or at least a tooth 81 thereof is a resin product such as of nylon resin. Since the worm 70, which is the metal product, is meshed with the wheel 80, which is the resin product, it is possible to make meshing comparably smooth while further reducing noise.

A screw thread 71 (or, a tooth 71) of the worm 70 is set to be a single thread. On an outer periphery of the wheel 80, a plurality of teeth 81 having an equal pitch on the entire periphery thereof is formed. The wheel 80 is attached such that relative movement in the shaft direction relative to the pinion shaft 24 is limited, while relative rotation thereof is also limited. For example, the wheel 80 is coupled by a serration or a spline in the rotational direction relative to the pinion shaft 24, while it is attached by a snap circle in the shaft direction. By meshing the wheel 80 on a load side with the worm 70 on a drive side, it is possible to transmit torque from the worm 70 to the load through the wheel 80.

Various performances are required for this worm gear mechanism 44. For example, improvement of a contact ratio and enhancement of strength are listed among them. Details are described using the next drawing and after.

Figure 21:
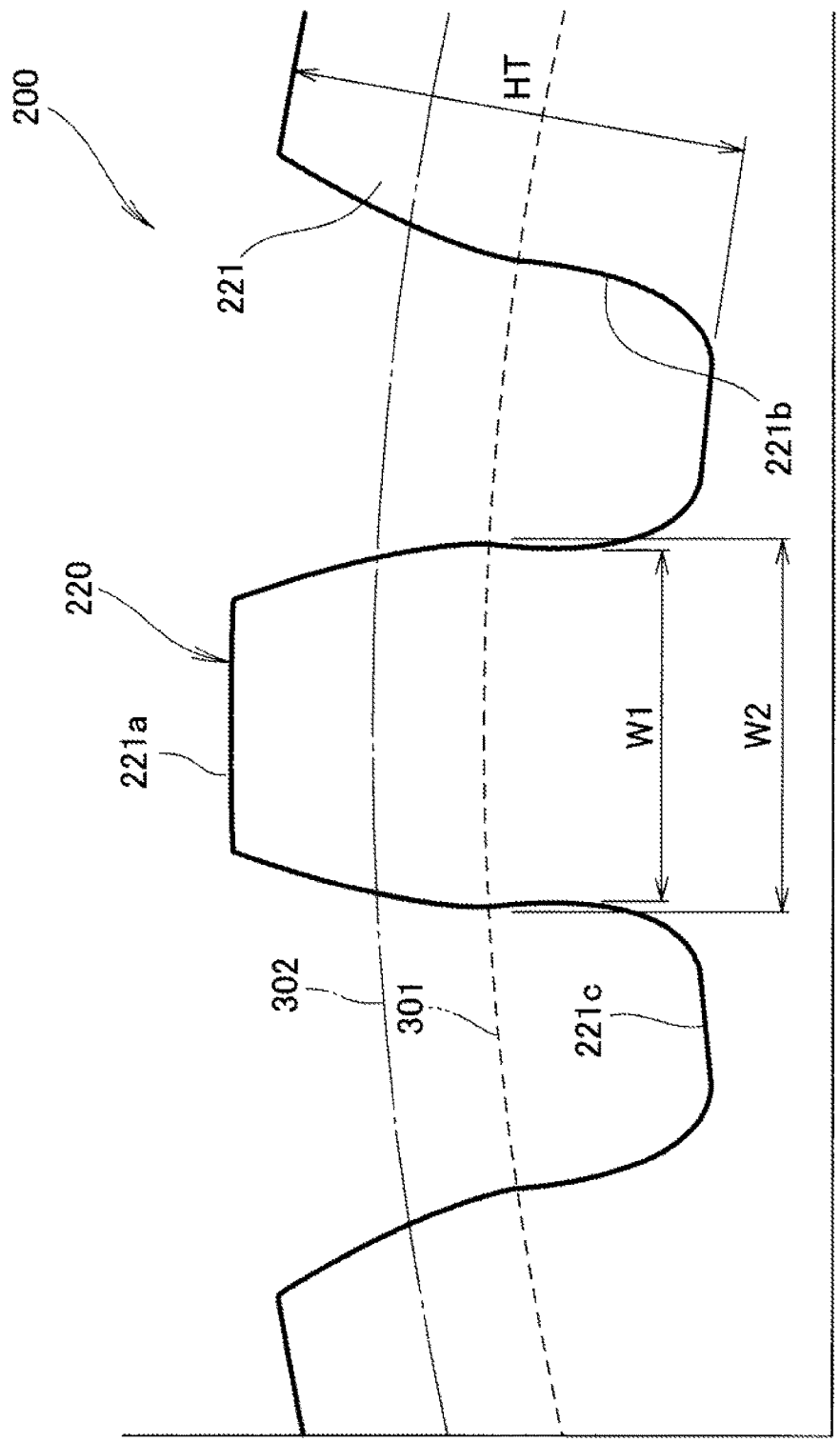
FIG. 21 is a view illustrating a problem in the tooth profile of the conventional worm wheel illustrated in FIG. 5(a).

Firstly, a conventional worm gear mechanism 200 illustrated in FIG. 21 is described. A tooth profile of a worm wheel 220 of the worm gear mechanism 200 is an involute profile having a tooth tip 221a, a tooth bottom 221c, a base circle 301, and a pitch circle (meshing pitch circle) 302. On an outer periphery side of the base circle 301, a tooth thickness is W2 at a part where a tooth 221 has the maximum thickness. Conventionally, to improve the contact ratio and to enhance the strength of the worm gear mechanism 200, there has been known a method of increasing a tooth depth HT of the wheel 220 having the involute profile.

However, when the worm wheel 220 undergoes gear cutting by a hob, undercutting occurs to a tooth root 221b. On a side nearer to a center of the wheel 220 than the base circle 301, a tooth thickness is W1 at a part where the tooth 221 has the minimum thickness. In this way, since the tooth root 221b has a narrow part, the tooth thickness W1 is smaller than W2. As a result, bending strength of the tooth 221 is decreased. Furthermore, the tooth profile of the wheel 220 is a projected shape having a small curvature radius at a part around the base circle 301. Since it is the projected shape having the small curvature radius, a contact area, which contacts with the worm, decreases. As a result, a meshing contact face pressure increases. That is, when the tooth depth FIT of the wheel 220 having the involute profile is increased, the bending strength and the face pressure strength tend to be decreased.

Figure 22:
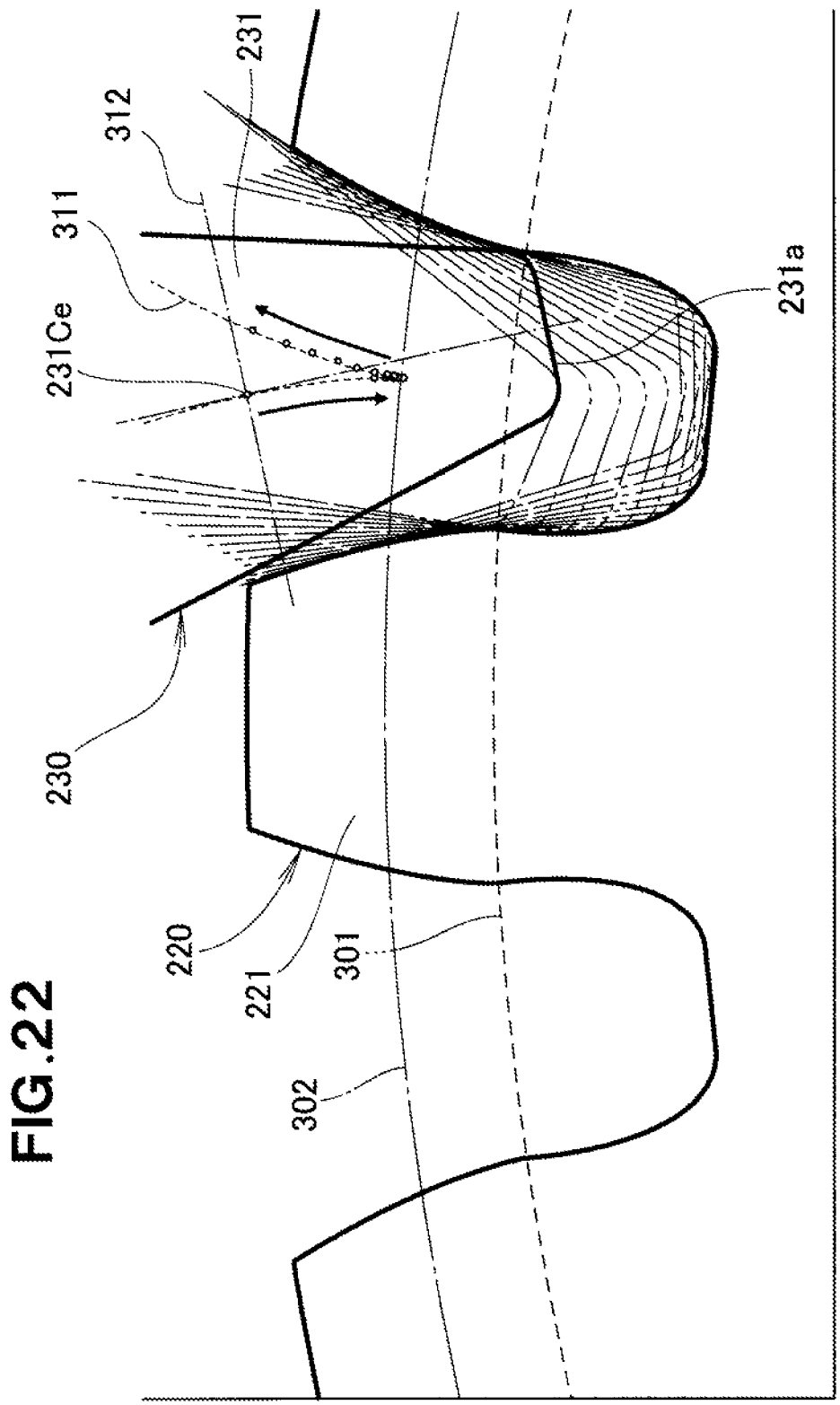
FIG. 22 is a view illustrating a movement of a hob during gear cutting of the worm wheel illustrated in FIG. 21.

As illustrated in FIG. 22, the tooth profile of the wheel 220 is molded by a hob (hob cutter) 230. A pitch center 231Ce of a tooth 231 of the hob 230 is positioned at a part of a line 312 (pitch height 312). A locus of the pitch center 231Ce is illustrated by a line 311. As it is clear from the locus 311, the tooth 231 of the hob 230 moves so as to roll on a pitch circle 302 of the wheel 220, and creates (or molds) the tooth profile of the wheel 220. At this time, a tooth tip 231a of the hob 230 gouges out a part lower than the base circle 301 of a tooth surface (a face close to the tooth bottom) of the wheel 220.

Figure 23:
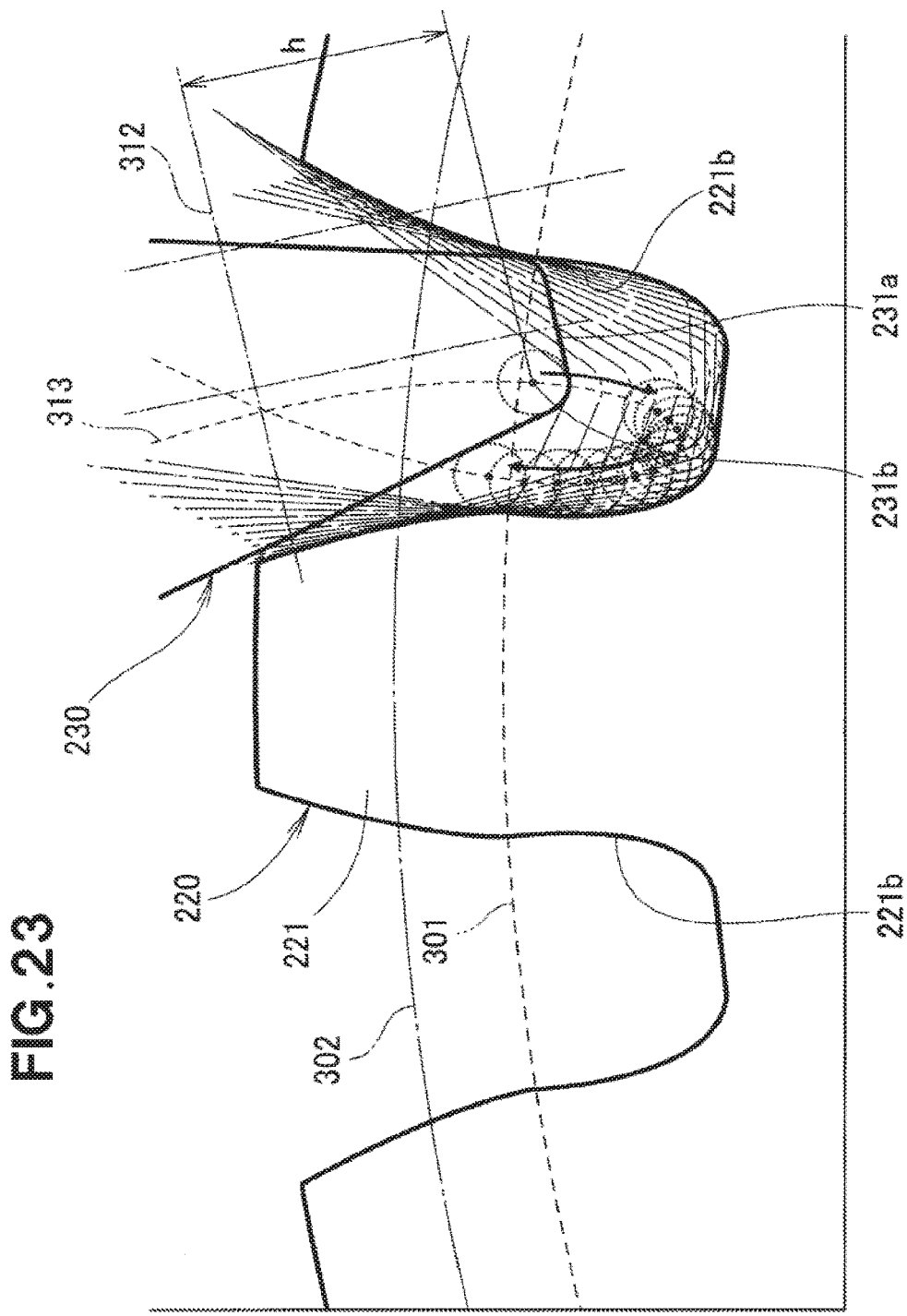
FIG. 23 is a view illustrating a movement of a tooth tip of the hob illustrated in FIG. 22.

As illustrated in FIG. 23, a corner portion of the tooth tip 231a of the tooth 231 of the hob 230 is shaped into an arc having a predetermined small curvature radius. A locus of a center 231b of an arc at a corner portion of the tooth tip 231a is denoted by a line 313. The present inventors have gained knowledge that a face of the tooth root 221b is formed into a recessed shape (narrow part shape) by the center 231b of the arc moving so as to make a circle. That is, the locus 313 of the center 231b of the arc at the corner portion of the tooth tip 231a makes a circle at a position on the center side of the base circle 301, whereby it is considered as a factor of causing an undercut phenomenon (undercutting). A length from the line 312 to the center 231b of a bent shape is h. The length h is referred to as an arm length.

Figure 24:
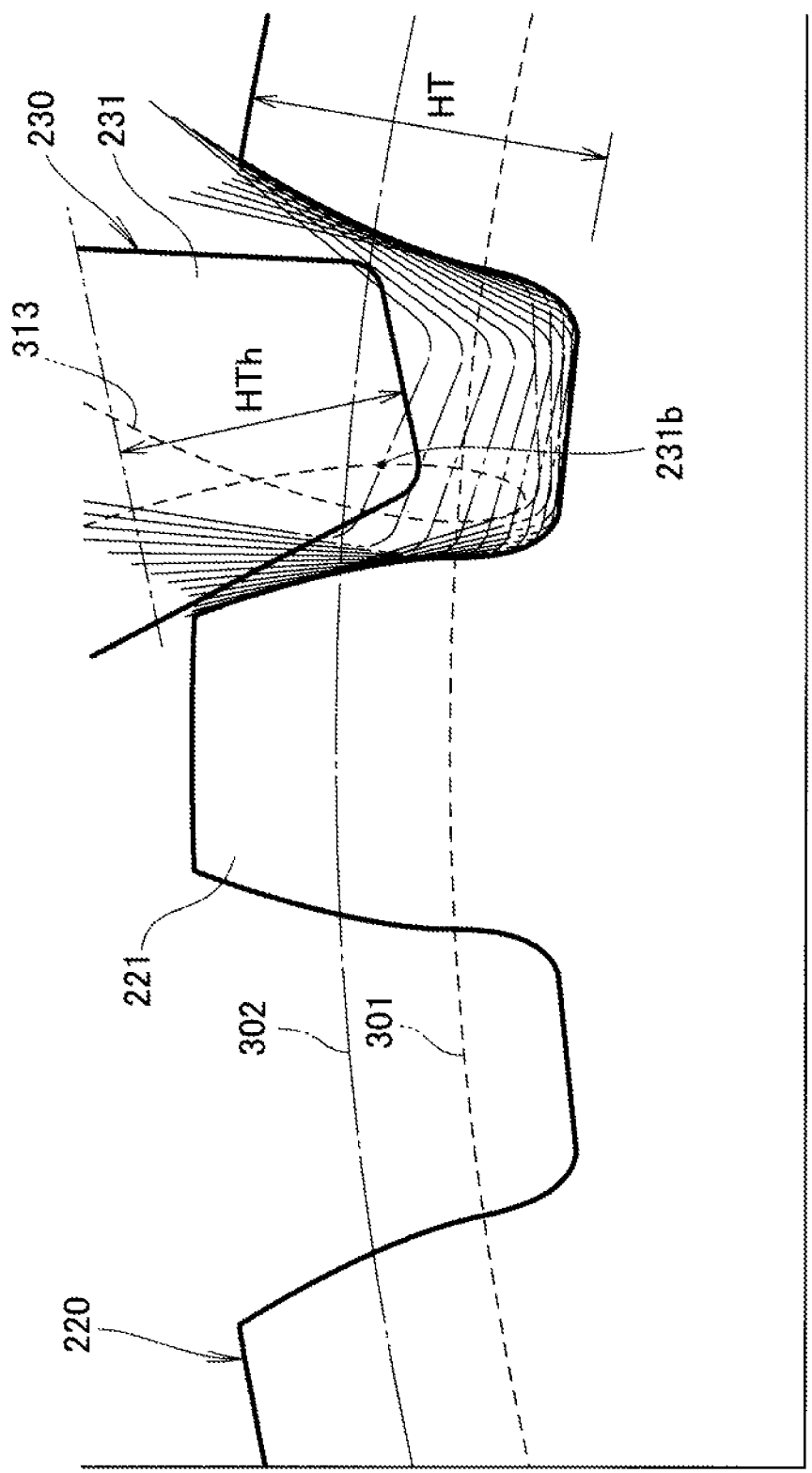
FIG. 24 is a view illustrating a measure for not forming a narrow part formed in the worm wheel illustrated in FIG. 21.

In order to prevent this undercut phenomenon (undercutting) from occurring, as illustrated in FIG. 24, it is possible to decrease a tooth depth HTh of the hob 230. By decreasing the tooth depth HTh, the locus 313 of the center 231b of the arc at the corner portion of the tooth tip 231a (a circle made by the center 231b of the arc) becomes small on a side nearer to the center of the wheel 220 than the base circle 301. Accordingly, the undercut phenomenon (undercutting) is more unlikely to be caused. However, when the tooth depth HTh of the hob 230 is decreased, the tooth depth HT of the wheel 220 is also decreased.

Back to FIG. 23, the locus 313 of the center 231b of the arc at the corner portion of the tooth tip 231a of the tooth 231 of the hob 230 is considered again. The locus 313 forms a "negative shifted trochoid curve". The present inventors have considered that the reason why the locus 313 forms the negative shifted trochoid curve is because the center 231b of the arc at the corner portion exists on the side nearer to the tooth tip 231a than the pitch height 312. That is, by the locus 313 forming the negative shifted trochoid curve, the corner portion of the tooth tip 231a of the hob 230 performs a gear cutting action so as to form a circle on the side nearer to the center than the base circle 301. A face of the tooth root 221b is undercut by the corner portion of the tooth tip 231a of the hob 230. As a result, undercutting occurs on the face of the tooth root 221b.

Figure 25:
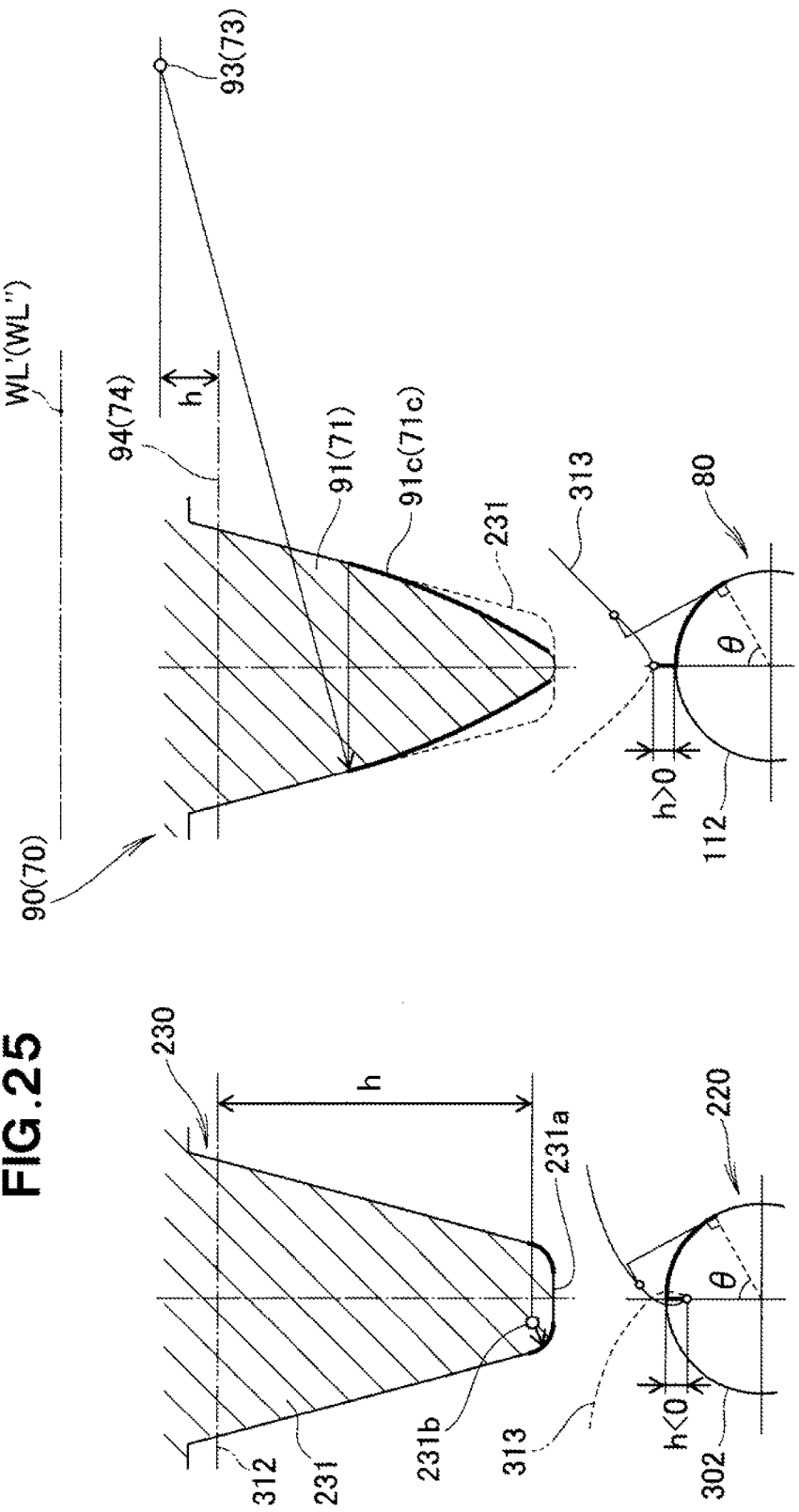
FIGS. 25(a) and (b) are views comparing the worm wheel illustrated in FIG. 21 with the worm wheel having no undercut illustrated in FIG. 4.

Next, the conventional wheel 220 illustrated in FIG. 22 is compared with the wheel 80 according to the embodiment illustrated in FIG. 4 based on FIGS. 25(a) and 25(b).

FIG. 25(a) is a schematic view illustrating the pitch circle 302 of the conventional wheel 220 illustrated in FIG. 22 and the tooth profile of the tooth 231 of the hob 230 for performing gear cutting on the wheel 220. The tooth 231 of the hob 230 is illustrated to be larger than the wheel 220. The tooth profile of the tooth 231 of the conventional hob 230 is an involute profile, and the corner portion of the tooth tip 231a is formed into an arc shape. The center 231b of the arc is positioned on the tooth tip 231a side relative to the pitch line 312 of the hob 230 (on a tooth root side of a tooth of the wheel 220). In this case, the locus 313 of the center 231b forms the negative shifted trochoid curve.

FIG. 25(b) is a schematic view illustrating a pitch circle 112 of the wheel 80 according to the embodiment illustrated in FIG. 4, and a tooth profile of a tooth 91 of a hob 90 for performing gear cutting of the wheel 80. The tooth 91 of the hob 90 is illustrated to be larger than the wheel 80. The tooth profile of the tooth 91 of the hob 90 according to the embodiment is the involute profile. Note, however, that an addendum surface 91c of the tooth 91 is rectified into an arc shape having a large curvature radius. This is to prevent the locus 313 of a center 93 of the arc of the addendum surface 91c (hereinafter, referred to as an "addendum surface center 93") from becoming the negative shifted trochoid. Specifically, the center 93 of the addendum surface 91c is positioned nearer to a center line (axis line) WL' of the hob 230 than is a pitch line 94. Accordingly, the locus 313 of the addendum surface center 93 forms a positive shifted trochoid. That is, it is possible to suppress a conventional locus, which forms a circle, by making it the positive shifted trochoid.

The above descriptions can be summarized as below. The tooth 91 of the hob 90 according to the embodiment is formed such that at least the addendum surface 91C has an arc shape with a large radius of curvature. The center 93 of the radius of the arc of the addendum surface 91C is positioned nearer to the center line (axis line) WL of the hob 90 than is the pitch line 94 of the hob 90.

It is preferred that the worm 70, which meshes with the wheel 80, be formed into a shape similar to that of the hob 90. That is, at least an addendum surface 71c of the tooth 71 of the worm 70 is formed into an arc shape. A center 73 of the radius of the arc of the addendum surface 71c is positioned nearer to the center line (axis line) WL of the worm 70 than a pitch line 74 of the worm 70.

Figure 26:
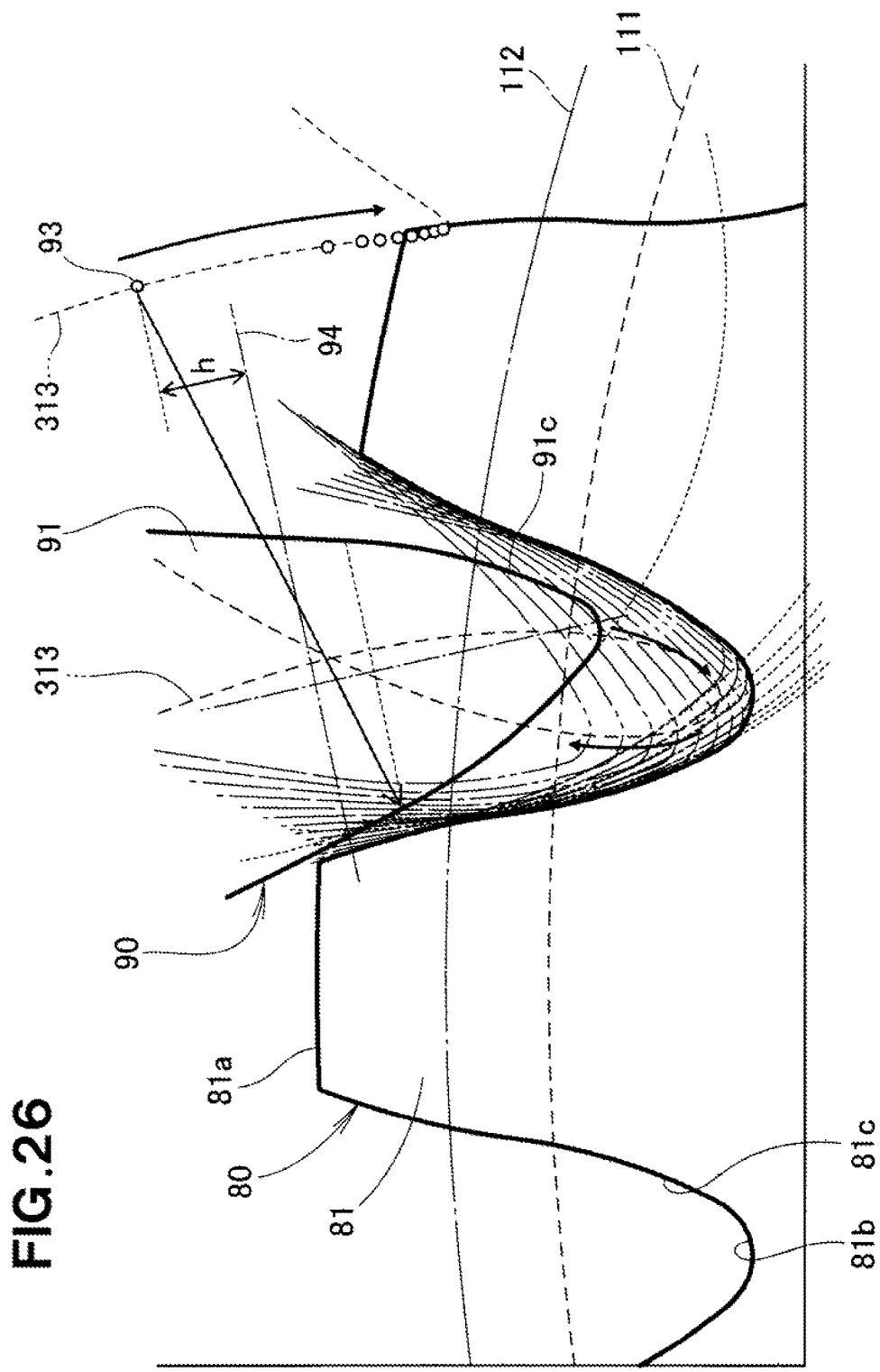
FIG. 26 is a view illustrating a profile of dedendum formed by a positive shifted trochoid illustrated in FIG. 25(b).

As illustrated in FIG. 26, the locus of the center 93 of an addendum surface of the wheel 80 according to the embodiment forms the positive shifted trochoid curve as denoted by the line 313. The tooth 81 of the wheel 80 formed by the hob 90, which moves along the line 313 (locus 313), is formed into a shape having no undercutting in a tooth root 81c. A reference numeral 81a denotes a tooth tip of the tooth 81 of the wheel 80. A reference numeral 81b denotes a tooth bottom of the tooth 81.

Figure 27:
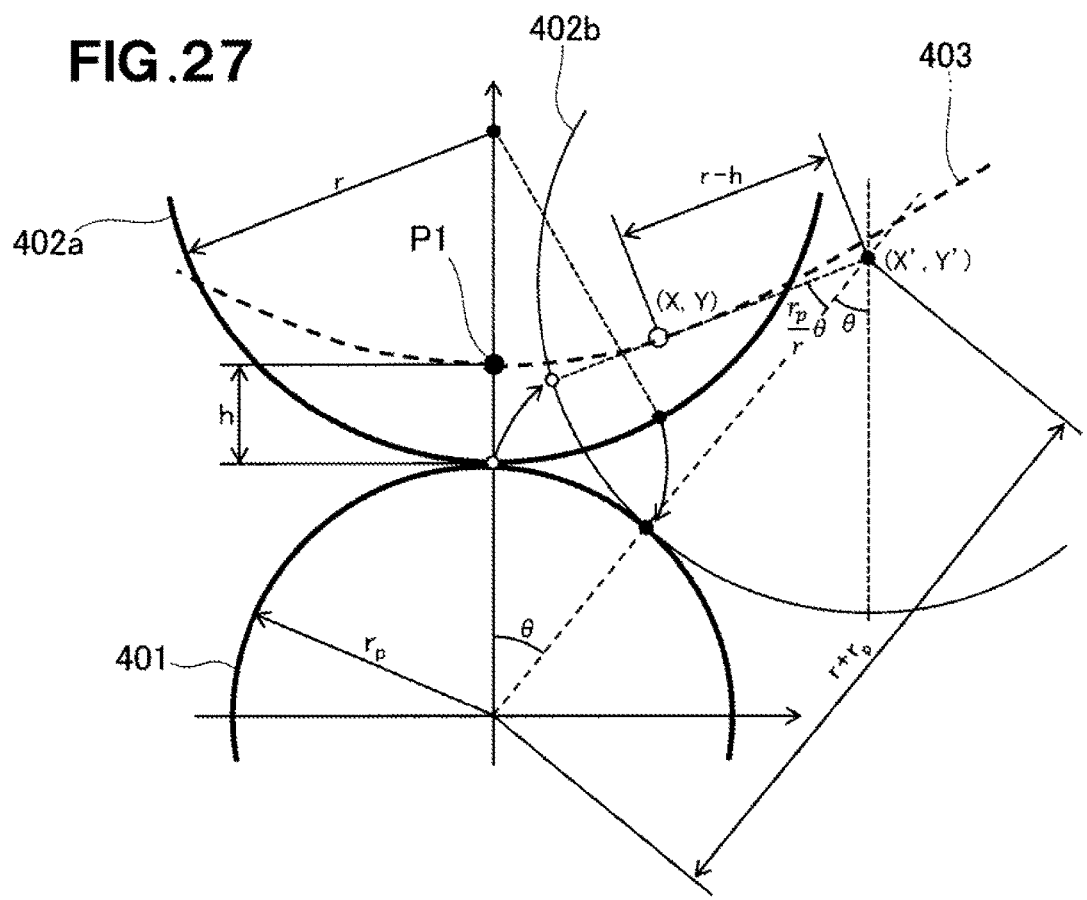
FIG. 27 is a view supplementing the trochoid curve illustrated in FIG. 26.
Figure 28:
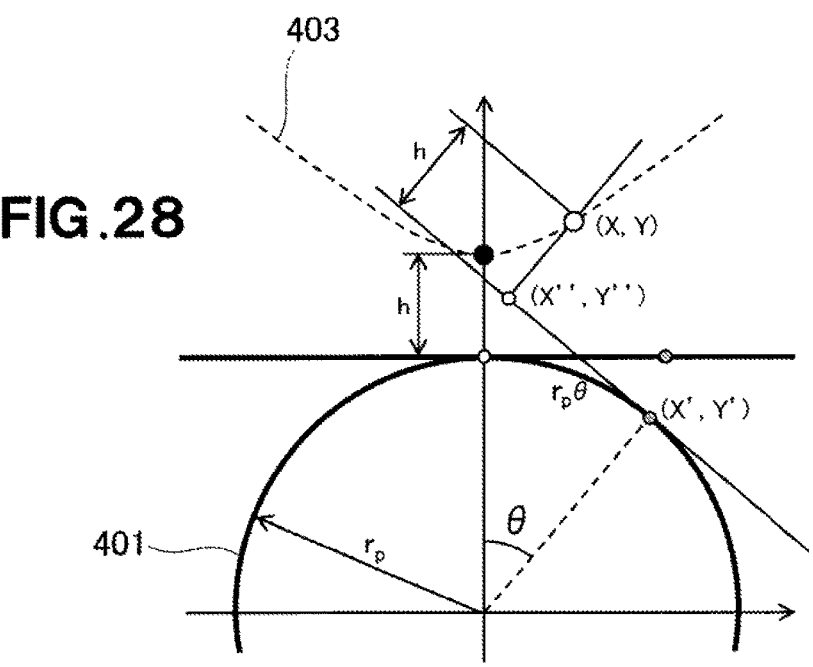
FIG. 28 is a view further supplementing the trochoid curve illustrated in FIG. 26.

Here, the trochoid curve, which is a principle of the present invention, is supplemented based on FIGS. 27 and 28. Firstly, with reference to FIG. 27, for a rolling circle 402a rolling on a fixed circle 401, a locus of a point (having coordinates X and Y) inside the rolling circle 402a, or the trochoid curve, is obtained as below. Note that the fixed circle 401 is a circle assuming a pitch circle of the wheel 80. Reference numeral 402a denotes a rolling circle rolling on the fixed circle 401. Reference numeral 402b denotes a rolling circle that has rolled on the fixed circle 401 for a predetermined distance from 402a. A line 403 denotes a locus of the point (X, Y) inside the rolling circle 402. That is, the line 403 is the trochoid curve. A reference numeral P1 denotes a point on the line 403 in the rolling circle 402a, and is referred to as an arm tip. A reference numeral h is a length (arm length) from the point P1 to the fixed circle 401.

With reference to FIG. 27, for the rolling circle 402, which rolls on the fixed circle 401, the locus of the point (X, Y) inside the rolling circle 402b, or the trochoid curve, is obtained as below.

[Mathematical Formula 1]

$$X' = (r + r_p)\sin\theta$$
$$Y' = (r + r_p)\cos\theta$$
$$X - X' = -(r - h)\sin\left(\frac{r + r_p}{r}\theta\right)$$
$$Y - Y' = -(r - h)\cos\left(\frac{r + r_p}{r}\theta\right)$$

Therefore, $$X = (r + r_p)\sin\theta - (r - h)\sin\left\{\left(1 + \frac{r_p}{r}\right)\theta\right\} \quad (11)$$
$$Y = (r + r_p)\cos\theta - (r - h)\cos\left\{\left(1 + \frac{r_p}{r}\right)\theta\right\}$$

With reference to FIG. 28, a case in which a radius of the rolling circle (see the reference numeral 402 in FIG. 27) forming the trochoid curve 403 is ∞ is considered.

$$X' = r_p \sin\theta$$
$$Y' = r_p \cos\theta$$
$$X'' - X' = r_p\theta\cos\theta$$
$$Y'' - Y' = r_p\theta\sin\theta$$
$$X - X'' = -h\sin\theta$$
$$Y - Y'' = h\cos\theta \quad \text{[Mathematical Formula 2]}$$

Therefore, $$X = (r_p + h)\sin\theta - r_p\theta\cos\theta$$
$$Y = (r_p + h)\cos\theta + r_p\theta\sin\theta \quad (12)$$

Here, reconsidering Formula (11), $$X = (r + r_p)\sin\theta - (r - h)\sin\left\{\left(1 + \frac{r_p}{r}\right)\theta\right\}$$
$$= (r + r_p)\sin\theta - (r - h)\left\{\sin\theta\cdot\cos\left(\frac{r_p}{r}\theta\right) + \cos\theta\cdot\sin\left(\frac{r_p}{r}\theta\right)\right\}$$
$$= (r + r_p)\sin\theta - (r - h)\left\{\sin\theta + \cos\theta\cdot\frac{r_p}{r}\theta\right\}$$

Substitution of +∞ for γ results in $$\frac{r_p}{\gamma}\theta = 0,$$

and then $$X = (r_p + h)\sin\theta\cos\theta$$

Similarly, $$Y = (r_p + h)\cos\theta\sin\theta$$

It is found that it corresponds with Formula (2).

This Formula is used in hob cutting.

Figure 29:
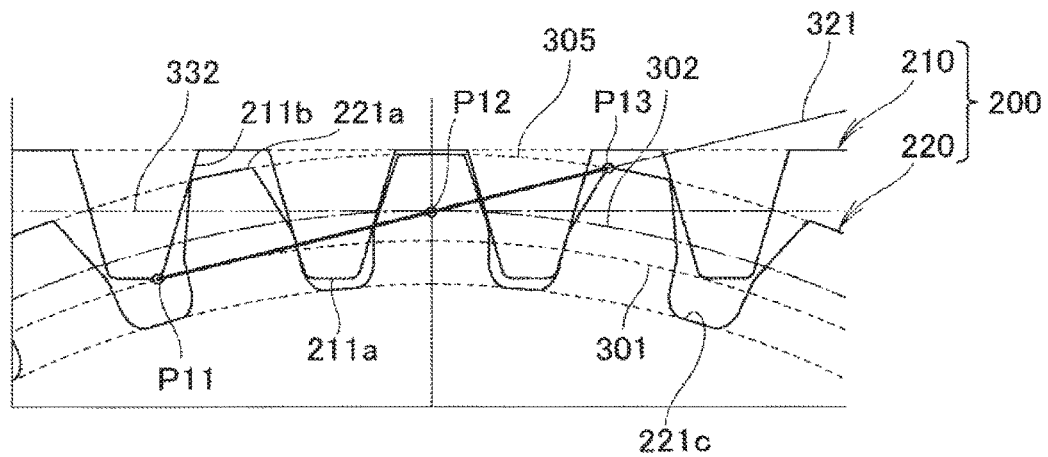
FIG. 29 is a view illustrating meshing of the worm wheel with the worm illustrated in FIG. 25.

Here, a description is given by comparing the conventional worm gear mechanism 200 with the worm gear mechanism 44 according to the embodiment. FIG. 29 is a view illustrating a meshing state of the conventional worm gear mechanism 200. The worm gear mechanism 200 includes a worm 210 and the worm wheel 220. A tooth profile of each of teeth of the worm 210 and the wheel 220 is the involute profile. An intersection point of a tooth tip of the tooth of the worm 210 and the base circle 301 of the wheel 220 is a first intersection point P11. An intersection point of a pitch line 332 of the worm 210 and the pitch circle 302 of the wheel 220 is a second intersection point P12. A straight line passing through the first intersection point P11 and the second intersection point. P12 is referred to as a meshing line 321. An intersection point of the meshing line 321 and a tooth tip circle 305 of the wheel 220 is intersection point P11 to the third intersection point P13 is referred to as a "length of path of contact".

The worm 210 and the wheel 220 can be meshed with each other in a range of the length of path of contact on the meshing line 321. The base circle 301 of the wheel 220 having the involute profile is uniquely determined by a module, the number of teeth, and a twist angle. Therefore, a position of the third intersection point P13 is uniquely determined as well. In order to make the length of path of contact longer, it is necessary to increase an outside diameter of the wheel 220. Accordingly, there is a problem in that the worm gear mechanism 200 cannot be downsized.

Furthermore, in a case where the conventional worm gear mechanism 200 is used in an electric power steering device for a vehicle, a resin material is often used for the tooth 221 of the wheel 220. In the wheel 220 using the resin material, elastic modulus of the material is small, whereby the tooth 221 is easily bent. In a case where a plurality of teeth 221 simultaneously meshes with each other, the lower a meshing depth is, the larger a shared load on the meshing tooth 221 is. That is, the load applied on each of the teeth 221 becomes larger.

Furthermore, in the involute profile, the curvature radius becomes smaller as it gets closer to the base circle 301. A meshing face pressure around the base circle 301 is very large compared to the meshing face pressure around the pitch circle 302. Accordingly, there is a problem in that it is difficult to extend the meshing line 321 nearer to a side of a wheel center than the base circle 301.

Figure 30:
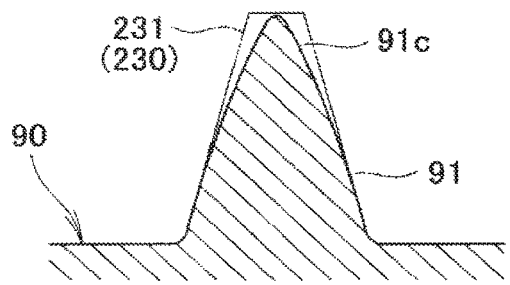
FIG. 30 is a view illustrating a gear cutting tool (hob) for forming the worm wheel illustrated in FIG. 25.

A tooth profile of the tooth 231 of the conventional hob represented by an imaginary line in FIG. 30 is an involute shape in which a meshing tooth surface is a straight line. In contrast, in a tooth profile of the tooth 91 of the hob 90 of the embodiment represented by a solid line in FIG. 30, a part of an addendum surface 910 is made to be thinner than that in the involute shape. Specifically, a part of the addendum surface 91c of the tooth 91 of the hob 90 according to the embodiment is decreased in tooth thickness to be a substantially arc shape abutting on an involute curve.

Figure 31:
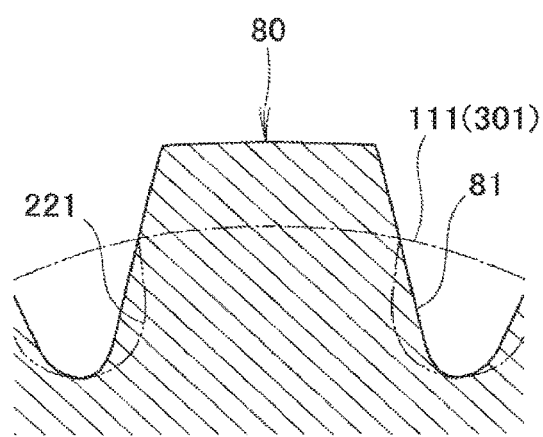
FIG. 31 is a view illustrating a tooth profile a worm wheel formed by the hob illustrated in FIG. 30.

The tooth 221 of the conventional wheel 220 represented by an imaginary line in FIG. 31 has been gear cut by the conventional hob 230 (see FIG. 30). In the conventional tooth 221, the undercut phenomenon (undercutting) occurs to a dedendum surface thereof. As a result, a tooth surface of the tooth 221 forms a remarkably projected shape around the base circle 301.

In contrast, a tooth 81 of the wheel 80 of the embodiment represented by a solid line in FIG. 31 is gear cut by the hob 90 of the embodiment. The tooth thickness of the tooth 91 of the hob 90 is thin. No undercut phenomenon (undercutting) occurs to a dedendum surface of the tooth 81 of the wheel 80. As a result, a tooth surface of the tooth 81 does not form a projected shape around a base circle 111. It is possible to decrease a face pressure acting on the tooth surface of the tooth 81.

Figure 32:
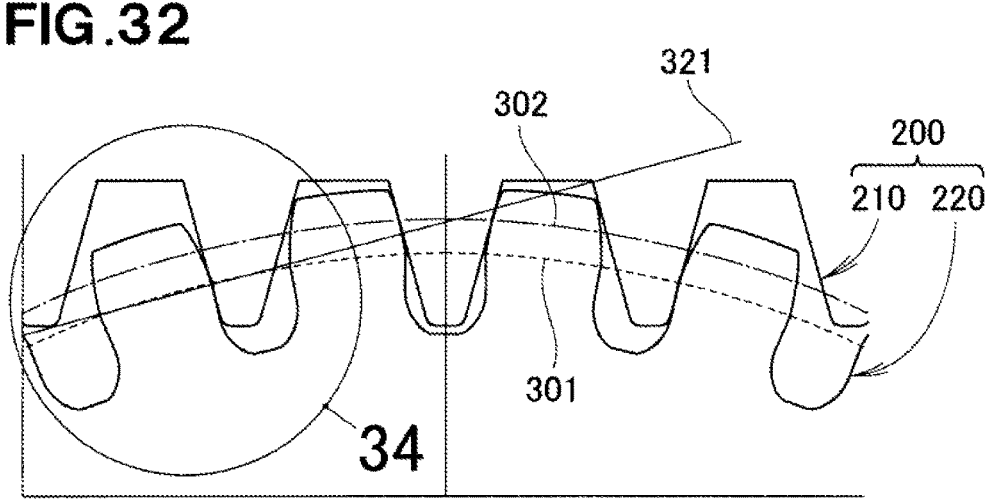
FIG. 32 is a view illustrating meshing of the conventional worm wheel (involute profile) illustrated in FIG. 5(a).
Figure 34:
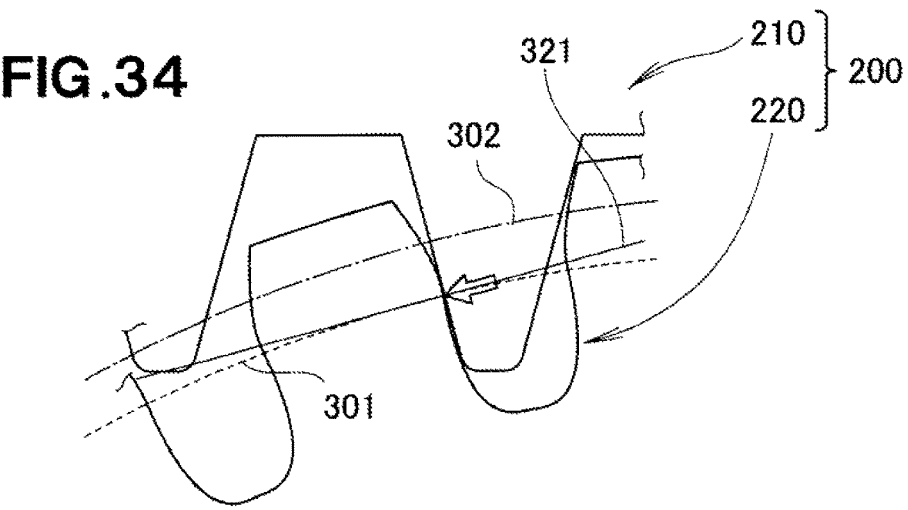
FIG. 34 is an enlarged view of a part 34 in FIG. 32.

FIG. 32 is a view illustrating a meshing state of the conventional worm gear mechanism 200, and it is illustrated in correspondence with the above-described FIG. 29. As denoted by an outlined arrow in FIG. 34, the worm 210 meshes with the wheel 220 around the base circle 301 (on the meshing line 321).

Figure 33:
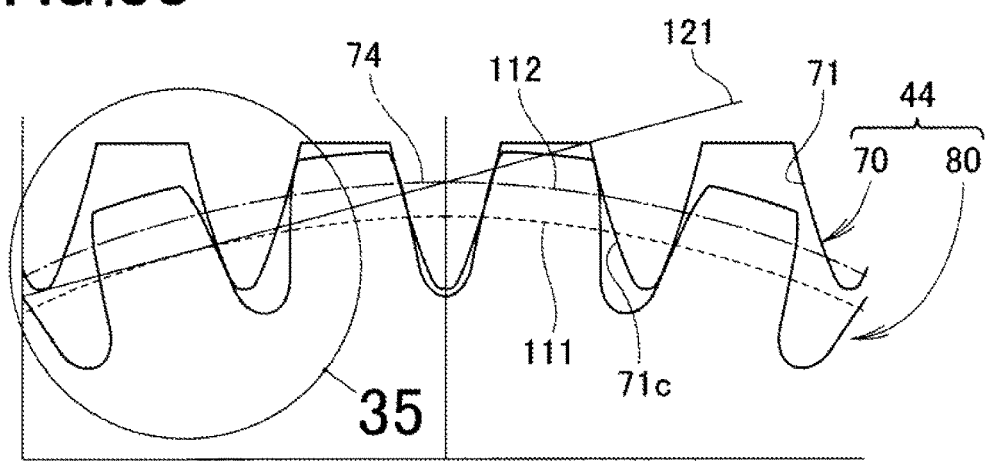
FIG. 33 is a view illustrating meshing of the worm wheel according to the present invention illustrated in FIG. 5(b).
Figure 35:
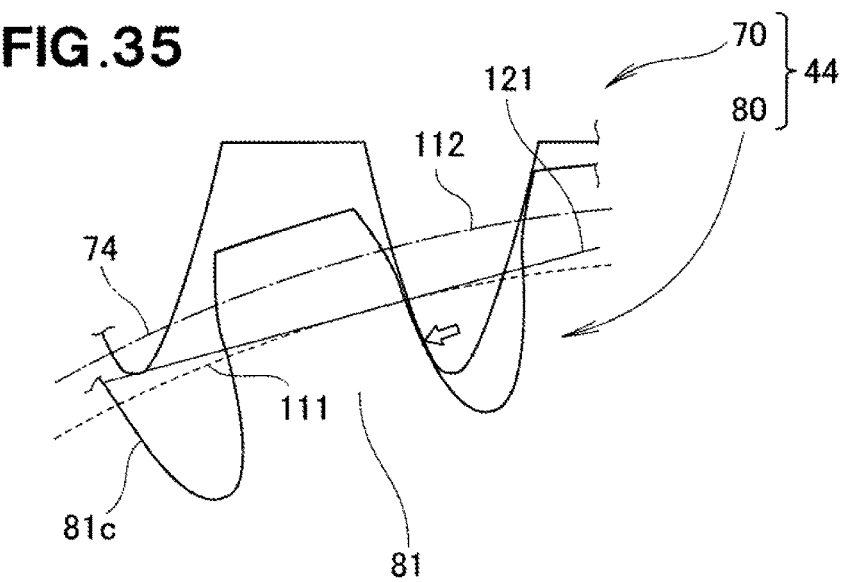
FIG. 35 is an enlarged view of a part 35 in FIG. 33.

FIG. 33 is a view illustrating a meshing state of the worm gear mechanism 44 according to the embodiment, and it is illustrated in correspondence with the above-described FIG. 29. As denoted by an outlined arrow mark in FIG. 35, the worm 70 meshes with the wheel 80 at a position nearer to the tooth bottom than the base circle 111. A reference numeral 121 denotes a meshing line of the wheel 80 and the worm 70.

Figure 36:
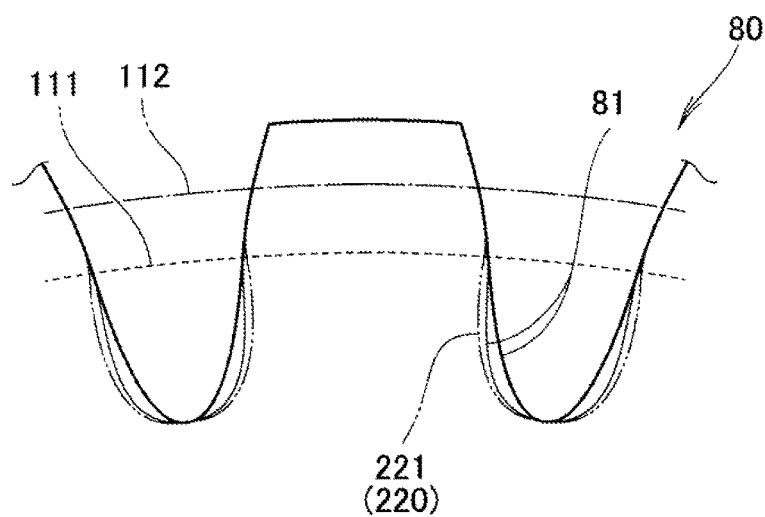
FIG. 36 is a view illustrating rectification of a tooth profile of the worm wheel illustrated in FIG. 35.

FIG. 36 is a view illustrating a change in the tooth profile of the tooth 81 of the wheel 80 by changing an amount of rectification of the tooth thickness of a tooth of the hob. The tooth 221 of the conventional wheel 220 represented by an imaginary line in FIG. 36 has a recessed dedendum surface.

That is, undercutting is caused to the dedendum surface. This is because a tooth 231 of the hob 230 (see FIG. 23) is not rectified at all.

In contrast, in the embodiment, as illustrated in FIG. 2500, the tooth 91 of the hob 90 has been rectified. The tooth profile of the tooth 81 of the wheel 80 in a case where the amount of rectification of the tooth 91 is small is represented by a thin solid line in FIG. 36. A dedendum tooth thickness of the tooth 81 is larger than before. The tooth profile of the tooth 81 of the wheel 80 in a case where the amount of rectification of the tooth 91 is large is represented by a thick solid line in FIG. 36. The dedendum tooth thickness of the tooth 81 is even larger.

In this way, as the amount of rectification of the tooth 91 of the hob 90 becomes larger, the recess on the tooth 81 of the dedendum surface of the wheel 80 decreases, and the dedendum tooth thickness becomes larger as well. Furthermore, a curvature radius of the tooth surface of the tooth 81 around the base circle 111 becomes larger. That is, the tooth surface of the tooth 81 does not form a large projected shape around the base circle 111 as before.

Figure 37:
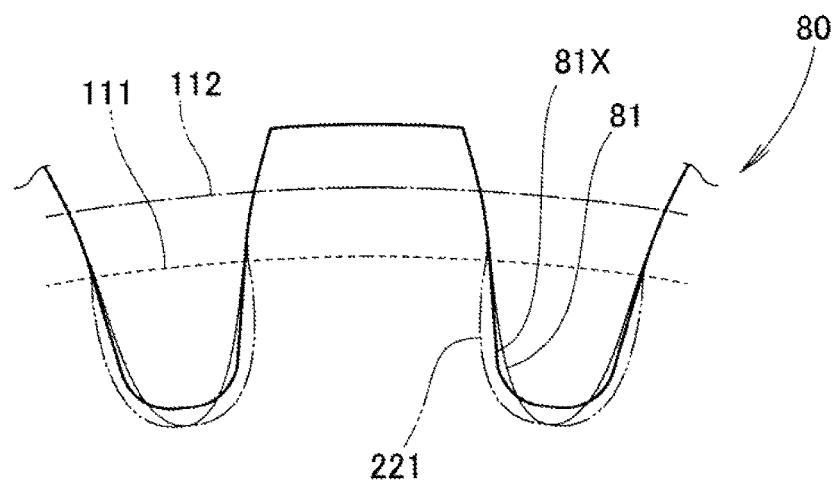
FIG. 37 is a view illustrating a modification of the worm wheel illustrated in FIG. 36.

The tooth 81 of the wheel 80 according to the above-described embodiment can also be a tooth 81X of a wheel 80X according to a modification illustrated in FIG. 37. In the tooth 81X of the wheel 80X according to the modification, at least a part of a dedendum tooth thickness is set to be larger than a dedendum tooth thickness of the tooth 221 of the conventional wheel Therefore, with the tooth 81X according to the modification, it is possible to obtain an equal effect as the tooth 81 according to the embodiment. To be more specific, the tooth profile of the tooth 221 of the conventional wheel 220 is represented by an imaginary line in FIG. 37. The tooth profile of the tooth 81 of the wheel 80 according to the embodiment is represented by a thin solid line in FIG. 37. The tooth profile of the tooth 81X of the wheel 80X according to the modification is represented by a thick solid line in FIG. 37.

The tooth profile of the tooth 81X according to the modification, for example, is formed to be an intermediate shape of the tooth profile of the conventional tooth 221 and the tooth profile of the tooth 81 according to the embodiment. For example, a dedendum height of the tooth 81 according to the embodiment is the same as a dedendum height of the conventional tooth 221. However, the dedendum height of the tooth 81X according to the modification is smaller than the dedendum height of the tooth 81 according to the embodiment. Furthermore, the dedendum tooth thickness of the tooth 81X according to the modification is larger than the dedendum tooth thickness of the conventional tooth 221, but is smaller than the dedendum tooth thickness of the tooth 81 according to the embodiment. Note, however, that there is no recess in the dedendum surface of the tooth 81X according to the modification.

The tooth 81X according to the modification has a special tooth profile, whereby it cannot be manufactured by a machine for creating an involute profile such as a hobbing machine; however, it can be directly created by injection molding using a metal mold or by milling. That is, in the embodiment, face pressure strength and bending strength of the tooth 81 is enhanced by an indirect method of creating the tooth 81 of the wheel 80 by a hob having a rectified tooth thickness. In contrast, in the modification, the tooth 81X can be created directly to enhance the face pressure strength and the bending strength of the tooth 81X. Accordingly, the tooth profile of the tooth 81X to be obtained can be designed directly and finely. Therefore, it is possible to further improve the tooth 81 according to the embodiment. For example, it is possible to finely change a gear tooth depth, a curvature radius at a tooth bottom, and a tooth thickness.

In creating the tooth 81 of the wheel 80 according to the embodiment illustrated in the above-described FIG. 26, an amount of rectification δ of the tooth 91 of the hob 90 minimally required for not undercutting (not causing undercutting of) the tooth root 221*b*, or a minimum amount of rectification δ, can be obtained as below (see FIG. 38). That is, describing with reference to FIG. 38, the minimum amount of rectification δ of the tooth 91 of the hob 90 can be obtained by the following Formula (8). Note, however, that the tooth profile of the wheel 80 is based on an involute profile Tim. The wheel 80 rotates in a rotary moving direction Rr (clockwise direction Rr in the drawing). The tooth 91 of the hob 90 moves in parallel relative to a pitch line Lhp (moving direction Ds). The tooth profile of the tooth 91 of the hob 90 is denoted by a line Hc. An intersection point of an involute line of action Lia of the tooth 81 of the wheel 80 and the involute profile Tim of the tooth 81 is a cutting point Ps. A point where undercutting of the tooth 81 of the wheel 80 is started by the hob 90, or an undercutting point, is denoted by Pr.

An intersection point of the involute line of action Lia of the tooth 81 of the wheel 80 and the pitch line Lhp of the tooth 91 of the hob 90 is denoted by Px. A straight line from a center CL of the wheel 80 to the intersection point PX is denoted by a standard line Lp. An intersection point of a tooth surface Th1 of the hob 90 of the tooth 91 rectified for the minimum amount of rectification δ only and the base circle 111 of the tooth 81 of the wheel 80 is denoted by Py. A straight line passing through the center CL of the wheel 80 and the intersection point Py is denoted by a rectified standard line Lt. A tilt angle (rectification angle) of the rectified standard line Lt relative to the standard line Lp is denoted by θ. The rectification angle is larger than a pressure angle α of the tooth 81 of the wheel 80 (tooth 91 of the hob 90) as a condition (θ>α).

m: a module of the wheel 80
Z: the number of teeth of the wheel 80
Rb: a radius of the base circle 111 of the wheel 80
Rp: a radius of the pitch circle 112 of the wheel 80
Rp−Rb·cos θ: height from the pitch line Lhp of the tooth 91 of the hob 90 to the intersection point (θ>α).

[Mathematical Formula 3]

$$\delta = R_b\{(\sin\alpha - \sin\theta) - \tan\alpha(\cos\alpha - \cos\theta)\} + \pi m \frac{(\theta - \alpha)Z}{2\pi} \quad (8)$$

In this way, in this embodiment, an area in which the tooth profile is rectified by the hob 90, which cuts an involute profile, is a tooth surface in a range where a height from the pitch line Lhp of the hob 90 toward a tooth tip direction, or a height from the pitch line Lhp of the tooth 91 of the hob 90 to the intersection point Py of the hob 90 is Rp−Rb·cos θ or above. Then, the tooth 91 is rectified in a direction of decreasing a tooth thickness thereof by the minimum amount of rectification δ or more at the intersection point Py where a height from the pitch line Lhp is Rp−Rb·cos θ.

The tooth surface of the tooth 91 rectified by the minimum amount of rectification δ is represented by the curve Th1. In this case, the involute line of action Lia of the tooth 81 of the wheel 80 is extended to a line of action L1 on the base circle 111. Furthermore, a tooth surface in a case where the amount of rectification of the tooth 91 is larger than the minimum amount of rectification δ is represented by a curve Th2. In this case, the involute line of action Lia of the tooth 81 of the wheel 80 is extended to a line of action L2, which is inside of the base circle 111. In this way, it is possible to enhance the bending strength of the tooth 81 of the wheel 80.

A theory on which the present invention is based is disclosed below. Note that a constituent element common with that in the above-described embodiment is denoted with the same reference numeral, and a description thereof is omitted.

A major problem in a conventional study has been a study of a tooth profile of an optimal worm for actively causing elastic deformation of a worm wheel. Accordingly, there has been still a room for improvement of a tooth profile of the worm wheel.

In a conventional designing method, in order to highly strengthen the worm wheel, a module and a twist angle are increased to geometrically improve a contact ratio. Using this method, it has been necessary to simply increase a diameter of the worm wheel in size.

In order to overcome this problem, the present inventors have tried to highly strengthen a small-sized worm wheel. In the present invention, the present inventors have further tried to downsize the worm wheel, and newly focused on a profile of dedendum of the worm wheel. As a result, they have reached an idea of improving the contact ratio by effectively meshing the worm even under a base circle of the worm wheel. In order to embody this, first, consideration has been given to a geometrical shape even under the base circle formed in actual processing. Based on the consideration, a theory of effectively meshing even under the base circle is referred to as the MUB (Meshing Under Base circle) theory. The MUB theory is proposed herein.

The tooth profile of the tooth 221 of the conventional worm wheel 220 illustrated in FIG. 5(*a*) is an involute profile. On a tooth surface of the tooth 221, there is formed an undercut part U, which is undercut by the conventional hob 230.

The tooth profile of the tooth 81 of the worm wheel 80 according to the embodiment illustrated in FIG. 5(*b*) is a new profile formed by the MUB theory. Based on the MUB theory, the worm wheel 80 (hereinafter, referred to as the wheel 80) is actually manufactured, and an effect of the MUB theory has been verified by measuring the length of path of contact. Knowledge obtained in a course of this study is reported herein.

Proposal of the MUB theory in which the worm is meshed even under the base circle of the wheel 80

Figure 6:
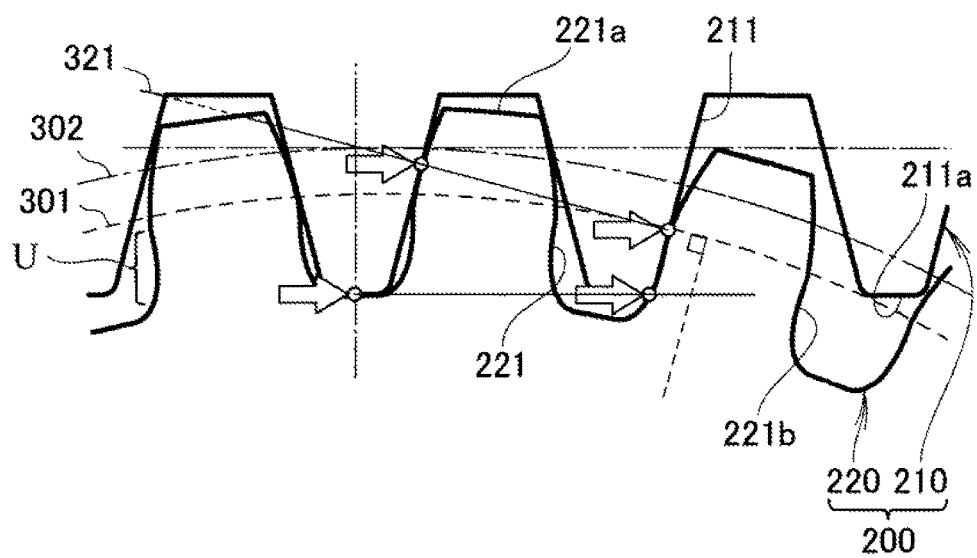
FIG. 6 is a view illustrating an improvement measure for the conventional worm wheel illustrated in FIG. 5.

In FIG. 6, a worm gear mechanism in which the conventional worm is meshed with a wheel is illustrated (Contact Line of Worm Tooth Tip Corner Radius, Contact Line of Involute Worm Wheel). Conventionally, the contact ratio has been improved by increasing the wheel 220 in size and by extending the meshing line 321 in a direction of the tooth tip 221*a*. In the present invention, in reverse thinking, the present inventors have considered that if the meshing line 321 can be extended in a direction of the tooth root 221*b*, it is possible to improve the contact ratio without increasing it in size. To realize this, studies have been made for a new tooth profile that favorably meshes even under the base circle 301.

Figure 16:
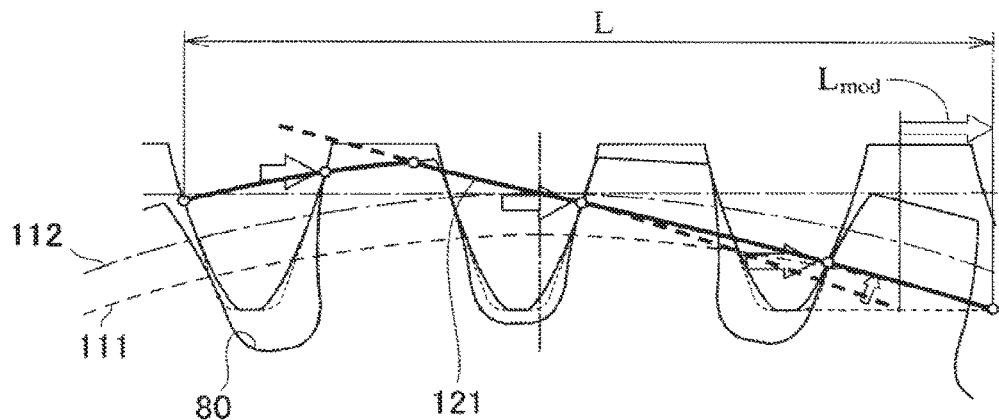
FIG. 16 is a view illustrating a state in which a worm rectified based on the worm illustrated in FIG. 15 is meshed with a worm wheel using the tooth profile illustrated in FIG. 14.

In order for the tooth 221 having an involute profile to mesh under the base circle 301, it is necessary to undercut the wheel 220 by the hob (reference numeral 230 in FIG. 5), and to mesh it with the worm having no bottom clearance (see FIG. 16). However, by meshing simply in this method, the tooth tip 211a of the worm 210 only contacts the wheel 220, whereby it is not possible to obtain an effective meshing.

Figure 7:
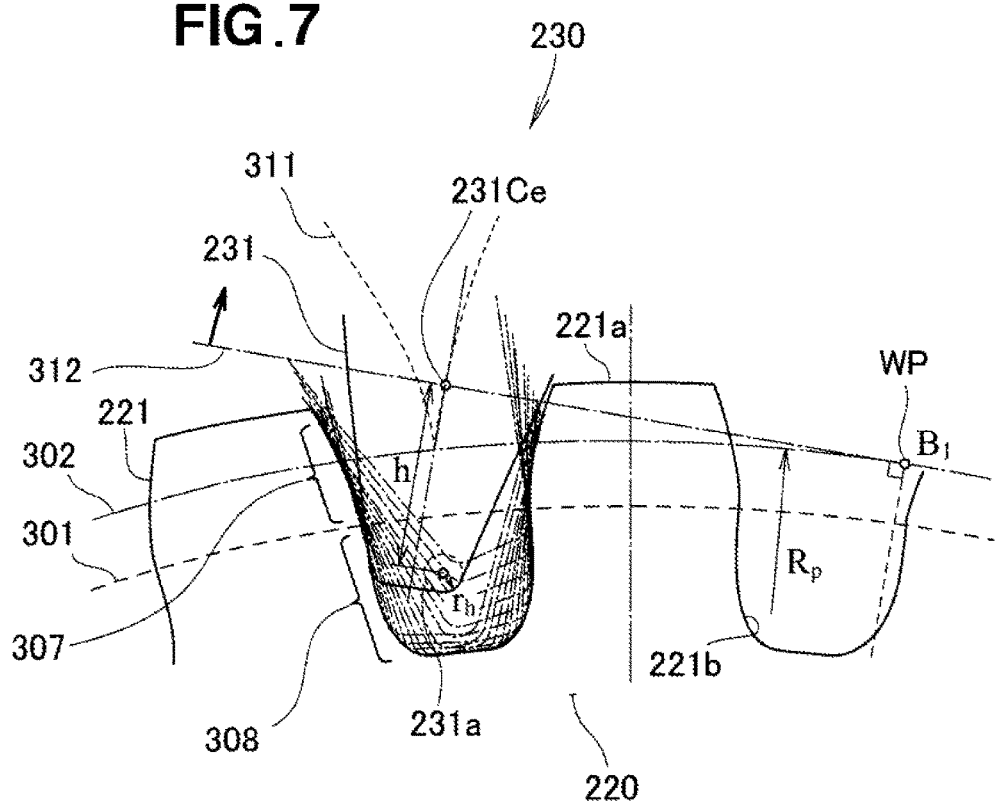
FIG. 7 is a view for formulating a profile of dedendum of the conventional worm wheel illustrated in FIG. 5.

Analysis of a conventional profile of dedendum not capable of meshing under the base circle A locus of the hob cutter is illustrated in FIG. 7. As illustrated in FIG. 7, the profile of dedendum formed by the conventional involute hob 230 is formulated and analyzed. An ideal tooth profile that effectively meshes under the base circle 301 is sought after by analyzing. When the tooth 221 of the wheel 220 is fixed to an absolute coordinate system and is gear cut, the datum line 312 of the hob 230 rolls on a gear cutting pitch circle of the wheel 220 without slipping. A center 231Ce of the tooth (edge) 231 of the hob 230 makes an epitrochoid curve 311. An envelope, which is formed when the hob 230 moves along the epitrochoid curve 311, forms the tooth profile of the tooth 221 of the wheel 220. In particular, the shape of the tooth root 221b under the base circle 301 is formed by the tooth tip 231a of the hob 230.

In the drawing, a working point (Hob Cutter Working Point) of the hob 230 is denoted by WP. A reference numeral 307 denotes an involute profile portion of the wheel 220. A reference numeral 308 denotes a dedendum portion (Dedendum Formed by Corner Radius) of the wheel 220.

Figure 8:
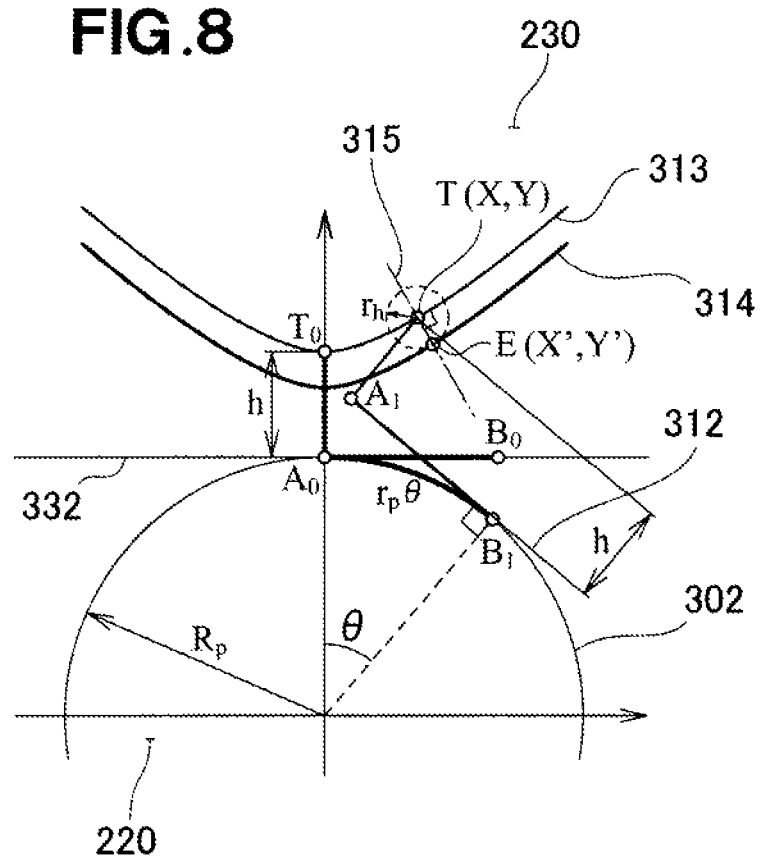
FIG. 8 is a modelled view for formulating the profile of dedendum of the conventional worm wheel illustrated in FIG. 5.

In FIG. 8, an envelope of the hob tooth (Envelope of Hob Tooth Tip) is illustrated. As illustrated in FIG. 8, modeling for formulating a profile of dedendum has been performed. First, the line 313 made by a tooth tip arc center T of the hob 230 is obtained. Next, an envelope 314, when a circle having a radius rh moves on the line 313, is obtained.

When the datum line 312 of the hob 230 contacts a phase point B1 of θ on the pitch circle 302 of the wheel 220, a line segment A1B1 is an unwound arc A0B1, and since both lengths are equal, coordinates (X, Y) of the tooth tip arc center T of the hob 230 can be expressed as Formulas (1) and (2) using θ as a variable.

[Mathematical Formula 4]

$$X = (R_p + h)\sin\theta - R_p\theta\cos\theta \quad (1)$$

$$Y = (R_p + h)\cos\theta + R_p\theta\sin\theta \quad (2)$$

Next, the envelope 314 of the tooth tip arc center is obtained. A point E on the envelope 314 is on a normal line 315 of the line 313 (trochoid curve), which passes through a point T. Since a distance TE corresponds to a hob tooth tip radius rh, it can be expressed as Formulas (3) to (5).

[Mathematical Formula 5]

$$\frac{dX}{d\theta} = h\cos\theta + R_p\theta\sin\theta \quad (3)$$

$$\frac{dY}{d\theta} = -h\sin\theta + R_p\theta\cos\theta \quad (4)$$

$$\sqrt{\left(\frac{dX}{d\theta}\right)^2 + \left(\frac{dY}{d\theta}\right)^2} = \sqrt{h^2 + R_p^2\theta^2} \quad (5)$$

Accordingly, the point E (X', Y') on the envelope can be expressed as Formulas (6) and (7).

[Mathematical Formula 6]

$$X' = X + \frac{r_h}{\sqrt{h^2 + R_p^2\theta^2}}\left(\frac{dY}{d\theta}\right) \quad (6)$$

$$= (R_p + h)\sin\theta - R_p\theta\cos\theta - \frac{r_h}{\sqrt{h^2 + R_p^2\theta^2}}$$

$$(h\sin\theta - R_p\theta\cos\theta)$$

$$Y' = Y + \frac{r_h}{\sqrt{h^2 + R_p^2\theta^2}}\left(-\frac{dX}{d\theta}\right) \quad (7)$$

$$= (R_p + h)\cos\theta + R_p\theta\sin\theta - \frac{r_h}{\sqrt{h^2 + R_p^2\theta^2}}$$

$$(h\cos\theta + R_p\theta\sin\theta)$$

Figure 9:
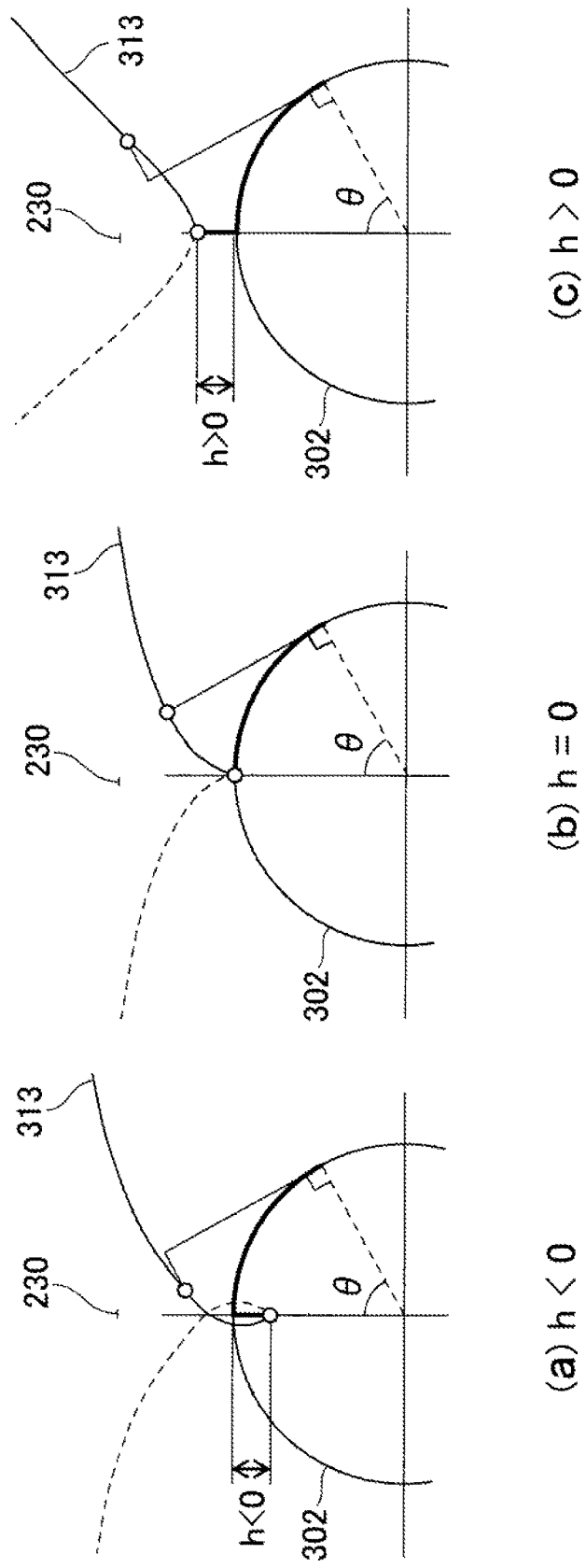
FIGS. 9(a)-9(c) are views illustrating a trochoid curve when a tooth tip arc center point of a hob illustrated in FIG. 6 is shifted (Shifted Trochoid).

By using the above Formulas (6) and (7), a trochoid curve in a case where the tooth tip arc center point of the hob 230 is shifted is illustrated in FIGS. 9(a) to 9(C). The trochoid curve changes with a shifting direction based on the datum line of the hob 230. A negative shifted trochoid in FIG. 9(a) is a curve forming a circle. A zero shifted trochoid in FIG. 9(b) is a substantially V-shaped curve having a corner portion at an intersection point with the pitch circle 302. A positive shifted trochoid in FIG. 9(c) is a substantially V-shaped curve having both a recessed shape and a low curvature projected shape.

Figure 10:
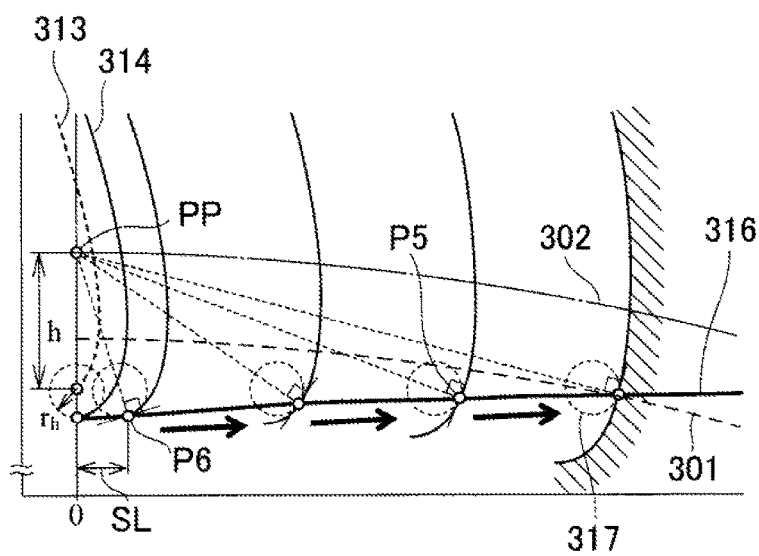
FIG. 10 is a view illustrating an envelope of a negative shifted trochoid illustrated in FIG. 9(a) and a line of action thereof.

Next, an envelope formed by each of the lines 313 is considered in FIG. 10, an envelope by the negative shifted trochoid and a line of action of a gear using the envelope as a tooth profile are illustrated (Meshing of Gears Formed by Negative Shifted Trochoid). In FIG. 10, a horizontal axis corresponds to a tooth thickness direction, and a vertical axis corresponds to a tooth tip direction.

A line of action 316 can be extended nearer to a center side than the base circle 301. However, a pressure angle of a contact point. P5 reaches 75 degrees (see P6) and increases up to around 90 degrees. Accordingly, the worm is self-locked and becomes not rotatable (see SL). On the other hand, when a bottom clearance is provided in the worm to avoid this, it does not contact geometrically. In the drawing, PP denotes a pitch point. The pitch point is a point through which a normal line of a tooth surface at a gear meshing contact point always passes. A line 317 is a worm tooth profile (Worm Profile).

Figure 11:
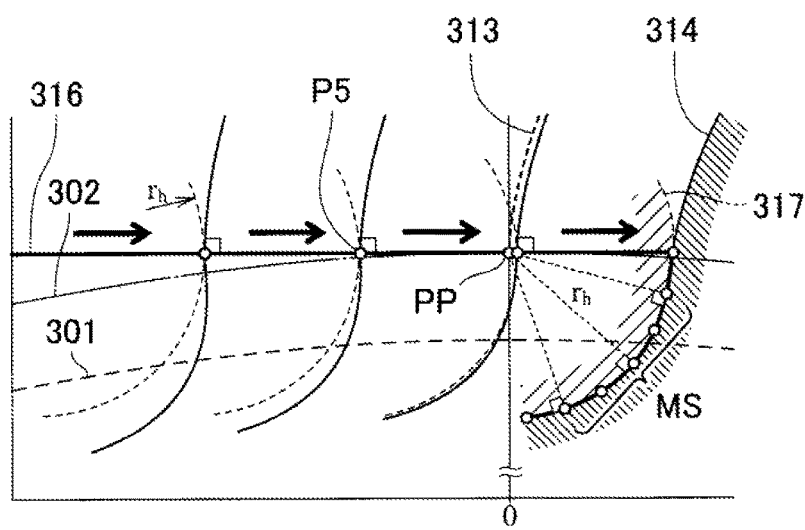
FIG. 11 is a view illustrating an envelope of a zero shifted trochoid illustrated in FIG. 9(b) and a line of action thereof.

In FIG. 11, an envelope by the zero shifted trochoid and a line of action thereof is illustrated (Meshing of Gears Formed by Zero Shifted Trochoid). In FIG. 11, a horizontal axis corresponds to a tooth thickness direction, and a vertical axis corresponds to a tooth tip direction.

The envelope 314 under the base circle 301 has an arc shape Novikov tooth profile. Accordingly, a transverse contact ratio becomes less than 1, whereby it is not possible to satisfy an isokinetic, which is a mechanical condition of the gear. In order to transmit constant speed rotation, it is necessary to realize an overlap ratio of 1 or more by a multi-row worm, whereby the wheel is increased in size. In the drawing, MS denotes a simultaneous meshing (Meshing Simultaneously) area.

Figure 12:
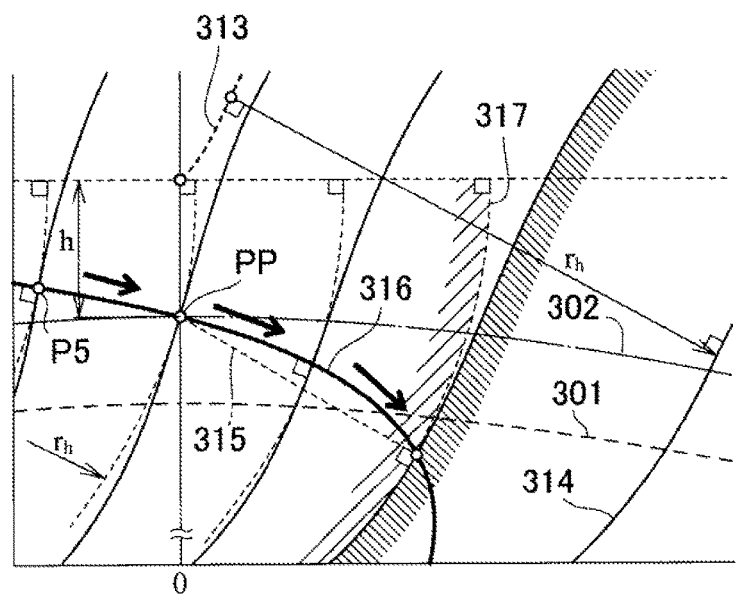
FIG. 12 is a view illustrating an envelope of a positive shifted trochoid illustrated in FIG. 9(c) and a line of action thereof.

In FIG. 12, an envelope by the positive shifted trochoid and a line of action thereof is illustrated (Meshing Of Gears Formed by Positive Shifted Trochoid). In FIG. 12, a horizontal axis corresponds to a tooth thickness direction, and a vertical axis corresponds to a tooth tip direction.

The line of action 316 can be extended nearer to the center side than the base circle 301. The normal line 315 of the envelope 314 at a contact point always passes through the pitch point PP, whereby it satisfies a mechanical condition of the gear, and it is possible to mesh effectively.

Figure 13:
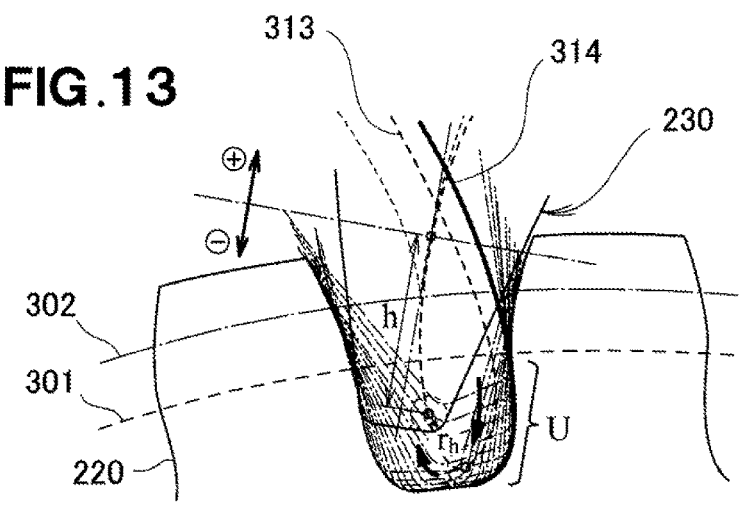
FIG. 13 is a view illustrating a reason of a problem in the conventional worm wheel illustrated in FIG. 5(a).

In FIG. 13, a profile of dedendum is illustrated. As illustrated in FIGS. 12 and 13, based on the above consideration, it is found that the conventional involute profile is unable to mesh under the base circle 301 because the profile of dedendum is formed by the negative shifted trochoid.

Proposal of the MUB Theory

Based on the above-described consideration, if the addendum tooth profile of a wheel can be formed by the positive shifted trochoid, it is possible to obtain a tooth profile that can effectively mesh even under the base circle. In order to achieve the positive shifted trochoid, a hob tooth tip (addendum) arc radius may be increased, and a center point of the arc may be shifted in a positive direction of the datum line of the hob.

Figure 14:
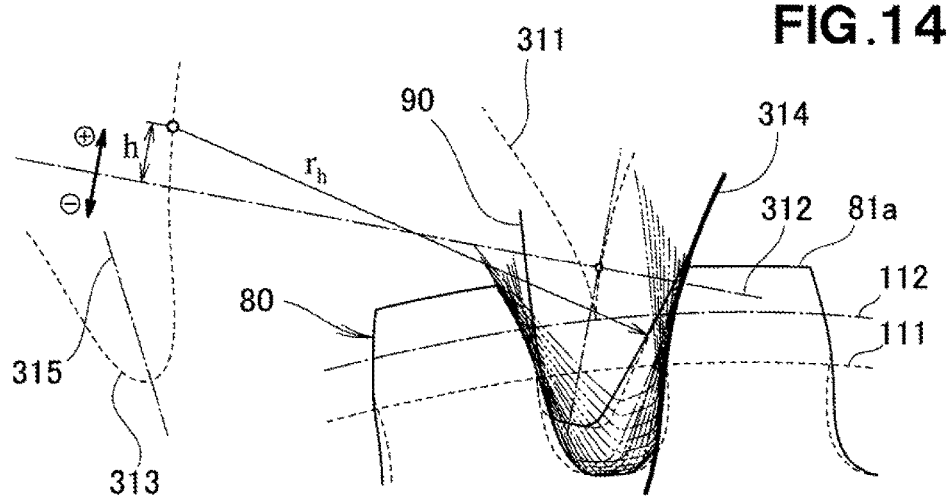
FIG. 14 is an enlarged view of a principal part of a worm wheel in which a tooth profile of a tooth root is formed by the positive shifted trochoid illustrated in FIG. 9(c).
Figure 15:
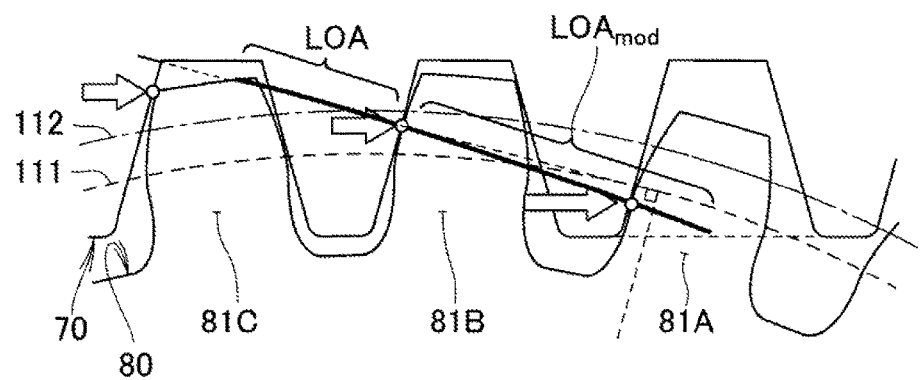
FIG. 15 is a view illustrating meshing of a worm with a worm wheel using the tooth profile illustrated in FIG. 14.

In FIG. 14, a wheel having a dedendum tooth profile formed by the positive shifted trochoid is illustrated (MUB Profile of Worm Wheel). Meshing of a worm using the tooth profile is illustrated in FIG. 15. It has a conventional involute meshing line (add a reference numeral in the drawing) on a face of the wheel tooth tip 81a, and on an addendum surface thereof, it is possible to mesh to under the base circle 111 along a line of action of the positive shifted trochoid. These two lines of action (add a reference numeral in the drawing) are linked smoothly, and the gear mechanical conditions are satisfied in all contact areas, whereby it is confirmed that effective meshing can be obtained by this new tooth profile.

As illustrated in FIG. 15, with the new tooth profile, a length of recess path can be extended from a conventional limit LOA to LOAmod, whereby it is indicated that the contact ratio can be improved from that of the involute profile. Here, the length of recess path refers to a length of path of contact from a pitch point to around a tooth tip of a worm.

This meshing theory by which it is possible to effectively mesh even under the base circle 111 is named the Meshing Under Base circle (MUB) theory.

Meshing Considering Elastic Deformation of the Wheel

Up to here, the wheel has been regarded as a rigid body in consideration. Based on the study so far, it is expected that the length of path of contact can be further extended considering elastic deformation of the wheel, whereby consideration is made in order to study this effect.

Considering the elastic deformation of the wheel, as in FIG. 15, a shared load concentrates on a tooth 81A having a low meshing depth. Therefore, conventionally a tooth thickness of a worm tooth tip face is modified into a negative direction to distribute the concentrated load to other meshing teeth 81B and 81C.

Using the tooth 81, it is possible to move an actual meshing line of action when a torque is applied in a direction of the pitch circle 112 of the wheel. The rectified worm meshed with the wheel 80 based on the MUB theory is illustrated in FIG. 16, and since a tilt of the meshing line of action 121 can be decreased, it is possible to further extend the length of path of contact from the result in the previous chapter, (see L). It is possible to design the contact ratio, which has been 2.2 before, to be 3.0 or above without increasing the wheel in size.

Figure 17:
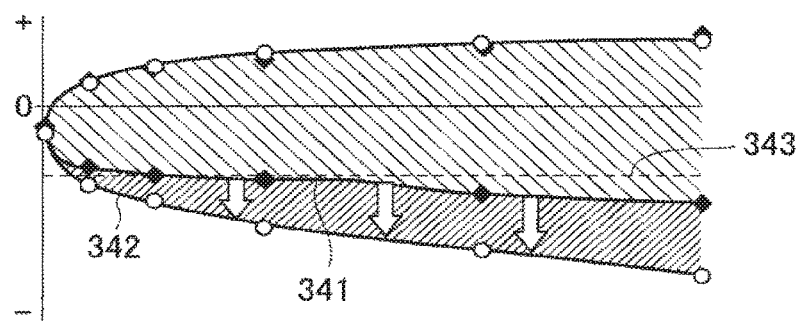
FIG. 17 is a graph comparing meshing of the worm wheel illustrated in FIG. 14 with meshing of the conventional worm wheel.

Next, a meshing contact area is considered. In FIG. 17, there is a comparison between the conventional involute profile and a tooth profile based on the MUB theory. A horizontal axis is a contact height of the wheel (Contact Height of Worm Wheel). A vertical axis is a contact height based on the pitch line (Contact Height Above Pitch Line). To the top of the drawing is an addendum direction, and to the bottom of the drawing is a dedendum direction. A line 341 connecting points plotted with black rhombuses denotes a conventional result. A line 342 connecting points plotted with white circles is a result by the MUB theory. A line 343 is a line indicating a meshing depth (Base Line) of the base circle. An area indicated with right down oblique lines is a contact area in both of the conventional and MUB theories. An area indicated with left down oblique lines is a contact area by the MUB theory only. By adopting a wheel by the MUB theory, it is possible to obtain the contact area in a wider area.

As illustrated in FIG. 18(a), with the involute profile wheel 220, it is difficult to increase the meshing area to under the base circle 301 due to undercutting. Since the undercutting is not caused in the wheel 80 based on the MUB theory as illustrated in FIG. 18(b), it, is possible to favorably enlarge the meshing area to under the base circle 111.

Verification of Test of Meshing by the MUB Theory

To verify meshing performance of the worm designed by the proposed MUB theory, after a change in meshing is calculated according to a worm phase, the worm 70 is actually manufactured and tooth bearing during meshing is verified.

As illustrated in FIGS. 19(a) and (b), as the verification method, a blue paste BP is applied on a tooth surface of the worm 70, which is meshed with the wheel 80. Then, torque is applied to the worm 70, and a shape of an area where the blue paste BP has been peel off is measured.

In FIG. 19(a), the worm 70 on which the blue paste BP is applied is illustrated. In the drawing, S denotes a point where contact with the wheel 80 is started (Start Point of Mesh). A reference numeral E denotes a point where the contact with the wheel 80 is ended (End Point of Mesh). A reference numeral CAa denotes a part where the blue paste BP has been peeled off, or a part that has contacted the wheel 80 (Contact Area of Worm).

In FIG. 19(b), there is illustrated the wheel 80 that has meshed with the worm 70. In the drawing, CAb is a part where the blue paste BP has attached, or a part that has contacted the worm 70 (Contact. Area of Worm Wheel). It is found that the worm 70 has contacted nearer to the center side of the base circle 111.

Figure 20:
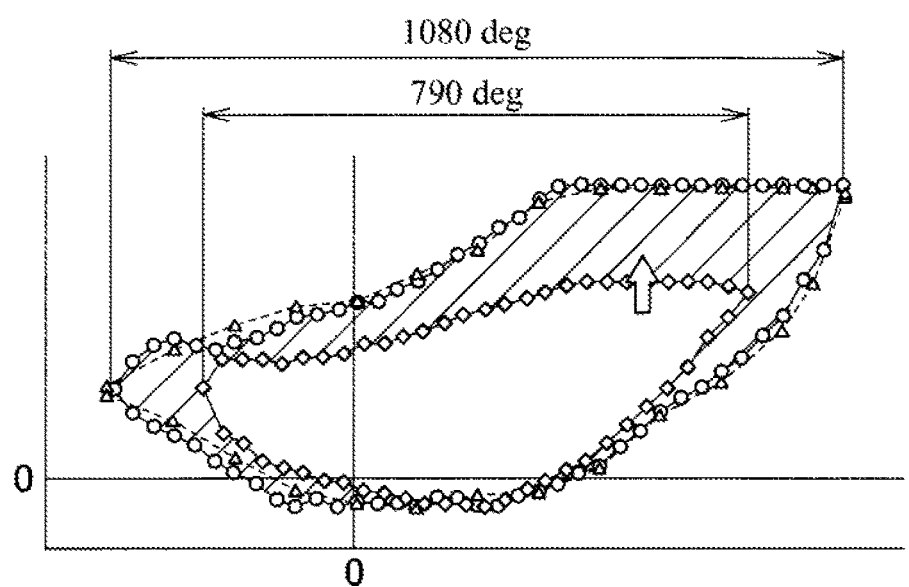
FIG. 20 is a graph illustrating a result of the test illustrated in FIG. 19.

These verification results are illustrated in FIG. 20. In FIG. 20, a contact area of the worm is illustrated. A horizontal axis represents a rotation angle of the worm. A vertical axis represents a contact height. A rhombuses shape plotting indicates a measurement result in a case where the involute profile wheel is used (Actual Measurement of involute gear). A triangular shape plotting indicates a calculation value in a case where the wheel according to the embodiment is used (Calculated Point). A round shape plotting indicates a measurement result in a case where the wheel according to the embodiment is used (Actual Measurement). Outside the points plotted with the rhombuses shape and inside the points plotted with the round shape, or a hatched area, corresponds to an area in which the meshing area has been enlarged by the wheel according to the embodiment.

Based on a phase of the worm at which meshing geometrically starts, a worm rotation direction in a case where meshing progresses from a dedendum to a tooth tip direction is set as a positive direction. Note that a rotation angular velocity of the wheel is set to 1.0 rps, and input torque to the worm is set to 3.2 Nm in the verification.

Since the meshing area of the worm tooth surface corresponds to about 1080 degrees of the worm rotation phase, it is verified that the contact ratio becomes 3.0. The contact ratio is increased by 36% compared to 2.2 of the conventional tooth profile. Furthermore, it is confirmed that the meshing area of the wheel is favorably increased to under the base circle.

These substantially correspond with a result of theory consideration, whereby effect of the MUB theory can be verified. Accordingly, it is now possible to predict meshing of a worm gear mechanism designed based on the MUB theory. Therefore, the MUB theory is effective as a designing method of an electric power steering device (EPS) in which installation of a small-sized and high strength worm gear mechanism is required.

In order to downsize the wheel, there has been proposed the MUB theory in which the contact ratio is improved by effectively meshing even under the base circle, and an effect of the theory has been verified through a test. As a result, the following has become found.

It has been found that the profile of dedendum of the wheel can be categorized into three types according to a shifting direction of the tooth tip arc center point of the hob. The tooth profile formed by the negative shifted trochoid is self-locked, whereby it is found that it cannot mesh effectively under the base circle. The tooth profile formed by the zero shifted trochoid has an arc tooth profile under the base circle, whereby a multi-row worm is necessary in order to satisfy the isokinetic of a gear, and it is found that the wheel is increased in size. By the MUB theory in which a dedendum tooth profile is formed by the positive shifted trochoid, it is possible to avoid increasing the wheel size and to effectively mesh under the base circle, with which it has not been possible to mesh with the involute profile. It has been proven that, by applying the MUB theory, it is possible to achieve a high contact ratio of 3.0 even with a single-row worm, which is generally considered to have a low contact ratio.

Descriptions have been given based on an example of installing the worm gear mechanism in an electric power steering device; however, it is also possible to install the worm gear mechanism in other apparatus, and it is not to be limited to the electric power steering device.

INDUSTRIAL APPLICABILITY

The worm gear mechanism according to the present invention is particularly suitable for use on an electric power steering device of a vehicle.

REFERENCE LIST

44 worm gear mechanism, 70 worm, 71 worm tooth, 71*c* worm addendum surface. 74 worm pitch line, 80 worm wheel, 90 hob, 91 hob tooth, 91*c* hob addendum surface, 93 hob addendum surface center, 94 hob pitch line, WL worm center line, 210 involute profile worm, 220 involute profile worm wheel, 200 conventional worm gear mechanism, WL' hob center line, L length of recess path, Llim conventional length of recess path.

The invention claimed is:

1. A worm gear mechanism comprising a worm and a worm wheel meshed with the worm, wherein
at least an addendum surface of a tooth of the worm is formed into an arc shape, and a center of a radius of an arc of the addendum surface is positioned nearer to a center line of the worm than is a pitch line of the worm,
the worm wheel is gear cut by a hob used in gear cutting of the worm wheel, at least an addendum surface of a tooth of the hob being formed into an arc shape corresponding to a shape of the addendum surface of the tooth of the worm, and a center of a radius of an arc of the addendum surface of the tooth of the hob being positioned nearer to a center line of the hob than is a pitch line of the hob,
a length of recess path of the worm gear mechanism, in which the worm is meshed with the worm wheel, is set to be larger than a length of recess path of a worm gear mechanism having an involute profile worm and a involute profile worm wheel, and
a locus of a center of the addendum surface of the tooth of the hob forms a positive shifted trochoid.

2. The worm gear mechanism according to claim 1, wherein at least a tooth of the worm wheel includes a resin molded article.

3. The worm gear mechanism according to claim 1, wherein a root of a tooth of the worm wheel has no undercutting.

4. The worm gear mechanism according to claim 3, wherein the worm wheel meshes with the worm under a base circle of the worm wheel.

* * * * *